(12) United States Patent
Wu et al.

(10) Patent No.: US 10,481,475 B2
(45) Date of Patent: Nov. 19, 2019

(54) SMART LIGHTING DEVICE AND CONTROL METHOD THEREOF

(71) Applicant: Compal Electronics, Inc., Taipei (TW)

(72) Inventors: Ting-Wei Wu, Taipei (TW); Wei-Jun Wang, Taipei (TW); Chia-Min Liao, Taipei (TW); Tse-Hsun Pang, Taipei (TW); Wen-Yi Chiu, Taipei (TW); Po-Hsien Yang, Taipei (TW); Shi-Kuan Chen, Taipei (TW); Jui-Tsen Huang, Taipei (TW); Ming-Che Weng, Taipei (TW); Kun-Hsuan Chang, Taipei (TW); Yu-Hao Tseng, Taipei (TW); Hsin-Chieh Cheng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 91 days.

(21) Appl. No.: 15/594,674

(22) Filed: May 15, 2017

(65) Prior Publication Data

US 2017/0347007 A1    Nov. 30, 2017

Related U.S. Application Data

(60) Provisional application No. 62/370,682, filed on Aug. 3, 2016, provisional application No. 62/361,470, filed
(Continued)

(51) Int. Cl.
*H04N 5/222* (2006.01)
*G03B 21/20* (2006.01)
(Continued)

(52) U.S. Cl.
CPC ....... *G03B 21/2046* (2013.01); *G03B 21/142* (2013.01); *G03B 21/2053* (2013.01); *G06F 3/017* (2013.01); *G06F 3/0425* (2013.01); *G06F 3/0484* (2013.01); *G06F 3/0486* (2013.01); *G06F 3/04817* (2013.01);
(Continued)

(58) Field of Classification Search
CPC .............................. G03B 21/2046; H04N 5/58
See application file for complete search history.

(56) References Cited

U.S. PATENT DOCUMENTS

| 5,541,820 A | 7/1996 | McLaughlin |
| 6,067,112 A | 5/2000 | Wellner et al. |

(Continued)

FOREIGN PATENT DOCUMENTS

| CN | 100468190 | 3/2009 |
| CN | 203868778 | 10/2014 |

(Continued)

*Primary Examiner* — Gary C Vieaux

(57) ABSTRACT

A smart lighting device includes a light source module, an image projection module and an ambient light sensing module. The image projection module is pivoted to the light source module, and the ambient light sensing module is electrically connected to the light source module and the image projection module. The ambient light sensing module is configured to sense a brightness value of ambient light. Brightness values of the light source module and the image projection module are adjusted according to the brightness value of the ambient light sensed by the ambient light sensing module. A control method for a smart lighting device is also provided.

32 Claims, 22 Drawing Sheets

Related U.S. Application Data on Jul. 12, 2016, provisional application No. 62/361,477, filed on Jul. 12, 2016, provisional application No. 62/341,053, filed on May 24, 2016.

(51) Int. Cl.

| | | |
|---|---|---|
| *G06F 3/0484* | (2013.01) | |
| *G06F 3/0481* | (2013.01) | |
| *H04N 9/31* | (2006.01) | |
| *G06K 9/20* | (2006.01) | |
| *H04N 5/225* | (2006.01) | |
| *H04N 5/232* | (2006.01) | |
| *H04N 5/235* | (2006.01) | |
| *H04N 5/262* | (2006.01) | |
| *G03B 21/14* | (2006.01) | |
| *G06F 3/042* | (2006.01) | |
| *H04N 5/247* | (2006.01) | |
| *H04N 5/33* | (2006.01) | |
| *G06F 3/0486* | (2013.01) | |
| *G06F 3/0488* | (2013.01) | |
| *G06F 3/16* | (2006.01) | |
| *G06T 11/60* | (2006.01) | |
| *G06F 3/01* | (2006.01) | |
| *H04N 9/07* | (2006.01) | |
| *G06F 16/58* | (2019.01) | |
| *G06F 3/043* | (2006.01) | |
| *G06F 3/044* | (2006.01) | |
| *G06F 3/045* | (2006.01) | |
| *G06K 7/14* | (2006.01) | |

(52) U.S. Cl.
CPC ...... *G06F 3/04842* (2013.01); *G06F 3/04883* (2013.01); *G06F 3/167* (2013.01); *G06K 9/2081* (2013.01); *G06T 11/60* (2013.01); *H04N 5/2256* (2013.01); *H04N 5/2258* (2013.01); *H04N 5/2351* (2013.01); *H04N 5/2352* (2013.01); *H04N 5/2354* (2013.01); *H04N 5/23216* (2013.01); *H04N 5/23296* (2013.01); *H04N 5/247* (2013.01); *H04N 5/2628* (2013.01); *H04N 5/33* (2013.01); *H04N 9/07* (2013.01); *H04N 9/315* (2013.01); *H04N 9/3155* (2013.01); *H04N 9/3179* (2013.01); *H04N 9/3194* (2013.01); *G06F 3/043* (2013.01); *G06F 3/044* (2013.01); *G06F 3/045* (2013.01); *G06F 3/0421* (2013.01); *G06F 16/58* (2019.01); *G06K 7/1417* (2013.01)

(56) References Cited

U.S. PATENT DOCUMENTS

| | | |
|---|---|---|
| 9,039,234 B2 | 5/2015 | Kasuga |
| 9,158,146 B2 | 10/2015 | Kinebuchi et al. |
| 2012/0038592 A1* | 2/2012 | Shyu ............... G03B 17/54 345/175 |
| 2012/0262682 A1 | 10/2012 | Chuang et al. |
| 2014/0043544 A1 | 2/2014 | Kasuga |
| 2016/0198552 A1* | 7/2016 | Chen ............... H05B 37/0272 348/460 |
| 2017/0223279 A1* | 8/2017 | Mueller ............... H04N 9/3179 |
| 2018/0059790 A1* | 3/2018 | Kolar ............... A47J 43/046 |

FOREIGN PATENT DOCUMENTS

| | | |
|---|---|---|
| CN | 205071408 | 3/2016 |
| TW | M445115 | 1/2013 |
| TW | I387700 | 3/2013 |
| TW | M452294 | 5/2013 |
| TW | 201326670 | 7/2013 |
| TW | I472701 | 2/2015 |

* cited by examiner disabling image projection module by processing module when image projection module is in first operation mode, and adjusting brightness value of illumination module to first brightness value — S410 controlling image projection module to switch from first operation mode to second operation mode by processing module and simultaneously adjusting image frame of image projection module when rotation angle of image projection module with respect to illumination module is the first angle — S420

FIG. 18

SMART LIGHTING DEVICE AND CONTROL METHOD THEREOF

FIELD OF THE INVENTION

The present invention relates to a lighting device, and more particularly to a smart lighting device having a projection function.

BACKGROUND OF THE INVENTION

As developments of projector related technology advanced, the size of the projection module has been significantly reduced. Therefore, the image projection module can be gradually integrated into other electronic products such as smart phones, lighting devices, or the like in recent years.

Conventional desktop devices having a projection function can be divided into two major categories, wherein one category of the desktop devices comprises an image projection module, an illumination module, and a projection mode switching module, and the projection mode switching module is electrically connected to the image projection module and the illumination module. When a lighting mode is activated, the projection mode switching module turns on the illumination module to provide light beam, and the desktop lighting device can be used as a lamp. In addition, when the projection mode is activated, the projection mode switching module turns on the image projection module to provide the image light beams, thereby forming an image on a surface of the desk, a wall or a screen. Examples of the above desktop device please refer to "Interactive desktop display system for automatically adjusting pan and zoom functions in response to user adjustment of a feedback image" disclosed in U.S. Pat. No. 6,067,112A, "Lamps with projection function" disclosed in R.O.C. Pat. No. TW M452294, "Projection table lamp" disclosed in R.O.C. Pat. No. TW I472701, and "Projection device with an illumination lamp" disclosed in U.S. Pat. Publication No. US 2012/0262682 A1.

In addition, the other category of the desktop devices merely comprises an image projection module and a projection mode switching module, wherein the projection mode switching module is electrically connected to the image projection module, and the image projection function and the desktop device shares a common light source. When the projection mode is activated, the projection mode switching module turns on the image projection module to provide image light beams, thereby forming an image on a surface of a desk, a wall or a screen. In addition, when the lighting mode is activated, the projection mode module turns off the image projection module, and no more image information would be provided and only a light source is provided, so that the desktop lighting device can be used as a table lamp. Examples of the above desktop device please refer to "Multipurpose micro projection lamp" disclosed in R. O. C. Pat. No. TW M445115, "Projection and control method therefor" disclosed in U.S. Pat. No. 9,158,146 B2, "Lighting device" disclosed in U.S. Pat. Publication No. US 2014/0043544, "Lamp-type projector" disclosed in China Pat. Publication No. CN 203868778, "LED lamp having projector device" disclosed in R. O. C. Pat. No. TW I387700, "Light emitting devices" disclosed in China Pat. Publication No. CN 100468190, "Combined lamp and movie projector" disclosed in U.S. Pat. No. US 5,541,820 A, and "Illumination apparatus" disclosed in U.S. Pat. No. 9,039,234 B2.

SUMMARY OF THE INVENTION

The present invention provides a smart lighting device for adjusting brightness values of an illumination module and an image projection module in accordance with a brightness value of ambient light.

The present invention also provides a control method of a smart lighting device for adjusting brightness values of an illumination module and an image projection module in accordance with a brightness value of ambient light.

For achieving above advantages, an embodiment of the invention provides a smart light device standing on a bearing surface and having a plurality of projection modes, and the smart light device includes an illumination module, a camera module; and an image projection module pivoted to the illumination module, wherein a brightness value of the illumination module is adjusted in accordance with the projection mode of the image projection module.

In an embodiment of the invention, the above smart lighting device further includes a light sensing module for sensing a brightness of ambient light around the smart lighting device.

In an embodiment of the invention, the above ambient light includes daylight, artificial light, light reflection of objects, and light reflection of wall surfaces and bearing surfaces.

In an embodiment of the invention, the above light sensing module includes a sensing element for the ambient light or a photosensitive element of at least one image capturing element of the camera module.

In an embodiment of the invention, the above brightness value of the ambient light is sensed by the sensing element for the ambient light.

In an embodiment of the invention, the above brightness value of the ambient light is sensed by the photosensitive element of the image capturing element of the camera module.

In an embodiment of the invention, the above brightness value of the ambient light is sensed by the sensing element for the ambient light and the photosensitive element of at least one image capturing element of the camera module.

In an embodiment of the invention, the above smart lighting device further includes a processing module electrically connected to the image projection module, the illumination module, and the camera module, wherein the image projection module has a plurality of projection modes, and one of the projection modes is a bearing surface projection modes, and the illumination module is configured to form an illumination area over the bearing surface for holding the smart light device, and the illumination area and an illumination area over the bearing surface projected by the image projection module are partially overlapped when the image projection module is switched to the bearing surface projection mode, and the processing module adjusts the brightness values of the illumination module and the image projection module in accordance with the brightness value of the sensed ambient light.

In an embodiment of the invention, the above smart lighting device further includes a processing module electrically connected to the illumination module, the image projection module and the light sensing module, and the light sensing module is electrically connected with the illumination module and the image projection module through the processing module, and the processing module adjusts the brightness values of the illumination module and the image projection module in accordance with the brightness value of the ambient light sensed by the light sensing module.

In an embodiment of the invention, the above processing module first determines whether the brightness value of the ambient light reaches a default value, and the processing module maintains the illumination module and adjusts the brightness value of the image projection module in accordance with the ambient light and a default database when the brightness value of the ambient light reaches the default value, and the processing module adjusts the brightness values of the illumination module and the image projection module in accordance with the ambient light and the default database when the ambient light does not reach the default value.

In an embodiment of the invention, the above processing module adjusts the brightness values of the illumination module and the image projection module in accordance with the ambient light and a default database.

In an embodiment of the invention, the above illumination module illuminates the bearing surface for holding the smart lighting device, and the camera module is electrically connected to the processing module, and the smart lighting device includes a plurality of operation modes, and one of the operation modes is a shooting mode, and the processing module adjusts the brightness values of the illumination module and the image projection module in accordance with the ambient light sensed by the light sensing module when the smart lighting device is switched to the shooting mode.

In an embodiment of the invention, the above processing module first determines whether the ambient light reaches a default value, and the processing module maintains the brightness of the illumination module when the ambient light reaches the default value, and the processing module adjusts the brightness value of the illumination module in accordance with the ambient light and a default database when the ambient light does not reach the default value.

In an embodiment of the invention, the above processing module adjusts the brightness value of the illumination module is in accordance with the ambient light and a default database.

In an embodiment of the invention, the above smart lighting device further includes a sensing module, and the sensing module is electrically connected with the processing module and includes an absolute coordinate mode and a relative coordinate mode, and the image projection module includes a plurality of projection modes, and the projection modes includes a bearing surface projection mode and at least one wall surface projection mode, and the processing module controls the sensing module to be switched to the absolute coordinate mode when the image projection module is switched to the bearing surface mode, and the process module controls the sensing module to be switched to the relative coordinate mode when the image projection module is switched to each of the wall surface modes.

In an embodiment of the invention, the above the sensing module includes a light emitting element and a light receiving element, wherein the light emitting element is electrically connected to the processing module and configured to form a sensing area on the bearing surface for holding the smart light device, and the light receiving element electrically is connected to the processing module and disposed on the illumination module, and a sensing field of the light receiving element covers the sensing area.

In an embodiment of the invention, the above light emitting device is an infrared emitting element, and the above light receiving element is an infrared receiving element.

In an embodiment of the invention, the above smart lighting device further includes a support body configured to stand on the bearing surface, and the illumination module is connected with the support body to face the bearing surface, wherein the light sensing module is disposed on a side of the illumination module away from the bearing surface, and the light emitting element is disposed on a base of the support body configured to connect the bearing surface or the illumination module.

Another embodiment of the invention provides a control method of a smart lighting device including a plurality of operation modes, capable of applying in a smart lighting device comprising an illumination module, an image projection module, and a light sensing module, wherein the image projection module is pivoted to the illumination module, and the control method of the smart lighting device comprising: sensing a brightness value of ambient light by the light sensing module, and adjusting brightness values of the illumination module and the image projection module in accordance with the brightness value of the sensed ambient light.

In an embodiment of the invention, the above control method of the smart lighting device further includes a step of adjusting brightness values of the illumination module and the image projection module in accordance with a projection mode of the image projection module.

In an embodiment of the invention, the above illumination module illuminates a bearing surface for holding the smart lighting device, and the image projection module includes a plurality of projection modes, and one of the projection modes is a bearing surface projection mode, and an illumination area on the bearing surface projected by the illumination module and an illumination area on the bearing surface projected by the image projection module are partially overlapped when the image projection module is switched to the bearing surface projection mode, and the brightness values of the illumination module and the image projection module are adjusted in accordance with the brightness value of the sensed ambient light.

In an embodiment of the invention, the above step of adjusting the brightness values of the illumination module and the image projection module in accordance with the brightness value of the sensed ambient light includes steps of: determining whether the brightness value of the ambient light reaches a default value, and maintaining the brightness value of illumination module and adjusting the brightness value of the image projection module in accordance with the brightness value of the ambient light when the brightness value of the ambient light reaches the default value, and adjusting the brightness values of the illumination module and the image projection module in accordance with the ambient light and a default database when the brightness value of the ambient light does not reach the default value.

In an embodiment of the invention, the above step of adjusting the brightness values of the illumination module and the image projection module in accordance with the brightness value of the sensed ambient light includes adjusting the brightness values of the illumination module and the image projection module in accordance with the brightness value of the ambient light and a default database.

In an embodiment of the invention, the above illumination module illuminates a bearing surface for holding the smart lighting device, and the smart lighting device further includes a camera module, and the camera module includes a plurality of operation modes, and one of the operation modes is a shooting mode, and the brightness values of the illumination module and the image projection module are adjusted in accordance with the brightness value of the sensed ambient light when the smart lighting device is switched to the shooting mode.

In an embodiment of the invention, the above step of adjusting the brightness values of the illumination module and the image projection module in accordance with the brightness value of the sensed ambient light includes: determining whether the brightness value of the ambient light reaches a default value, and maintaining the brightness value of illumination module when the brightness value of the ambient light reaches the default value and adjusting the brightness value of the illumination module in accordance with the brightness value of the ambient light and a default database when the brightness value of the ambient light does not reach the default value.

In an embodiment of the invention, the above step of adjusting the brightness values of the illumination module and the image projection module in accordance with the brightness value of the sensed ambient light includes adjusting the brightness values of the illumination module and the image projection module in accordance with the brightness values of the ambient light and the default database.

In an embodiment of the invention, the above smart lighting device further includes a sensing module, and the sensing module has an absolute coordinate mode and a relative coordinate mode, and the image projection module includes a plurality of projection modes, and the projection modes includes a bearing surface projection mode and at least one wall surface projection mode, and the sensing module is switched to the absolute coordinate mode when the image projection module is switched to the bearing surface mode, and the sensing module is switched to the relative coordinate mode when the image projection module is switched to each of the wall surface modes.

Yet another embodiment of the invention provides control method of a smart lighting device comprising first and second operation modes, capable of applying in a smart lighting device comprising a process module electrically connected with an illumination module, an image projection module, and a light sensing module, wherein the image projection module is pivoted to the illumination module, and the control method of the smart lighting device comprising: preferentially adjusting the brightness value of the image projection module through the processing module in accordance with the brightness value of the sensed ambient light under the first operation mode; and preferentially adjusting the brightness value of the illumination module through the processing module in accordance with the brightness value of the sensed ambient light under the second operation mode.

In an embodiment of the invention, the above first operation mode of the smart lighting device is an image projection operation mode.

In an embodiment of the invention, the above second operation mode of the smart lighting device is an image identification operation mode.

In an embodiment of the invention, the above step of preferentially adjusting the brightness value of the image projection module is to adjust a brightness value of an image frame projected by the image projection module to maintain the best projection brightness of the image frame when the brightness value of the ambient light is changed.

In an embodiment of the invention, the above step of preferentially adjusting the brightness value of the illumination module is to adjust a brightness value of the illumination module to maintain the best identification brightness when the brightness value of the ambient light is changed.

BRIEF DESCRIPTION OF THE DRAWINGS

The present invention will become more readily apparent to those ordinarily skilled in the art after reviewing the following detailed description and accompanying drawings, in which:

FIG. 18 is a schematic flowchart of an operation mode transforming method of a smart lighting device according to an embodiment of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
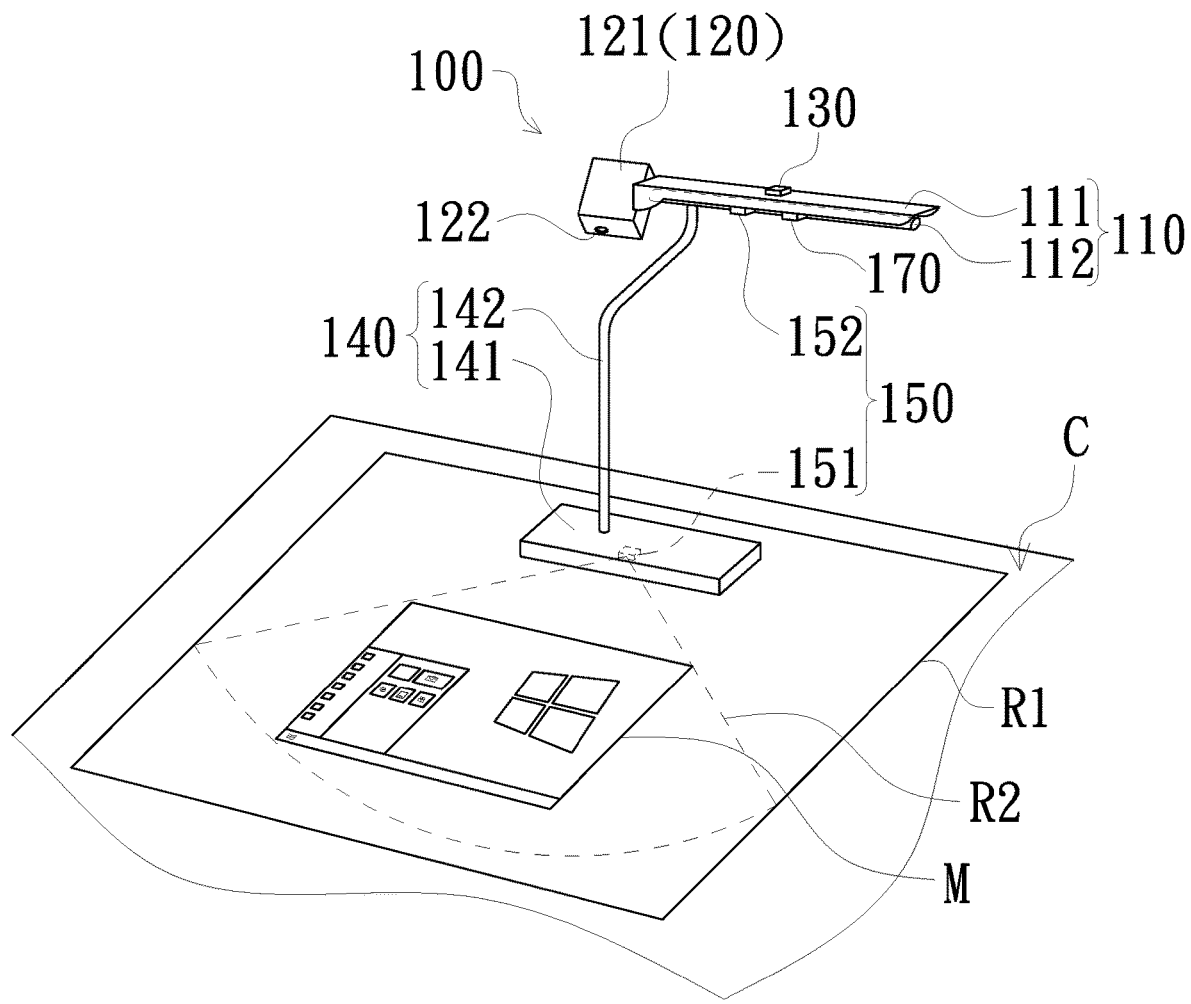
FIG. 1A is a schematic diagram showing a state of use of a smart lighting device according to an embodiment of the invention.
Figure 2A:
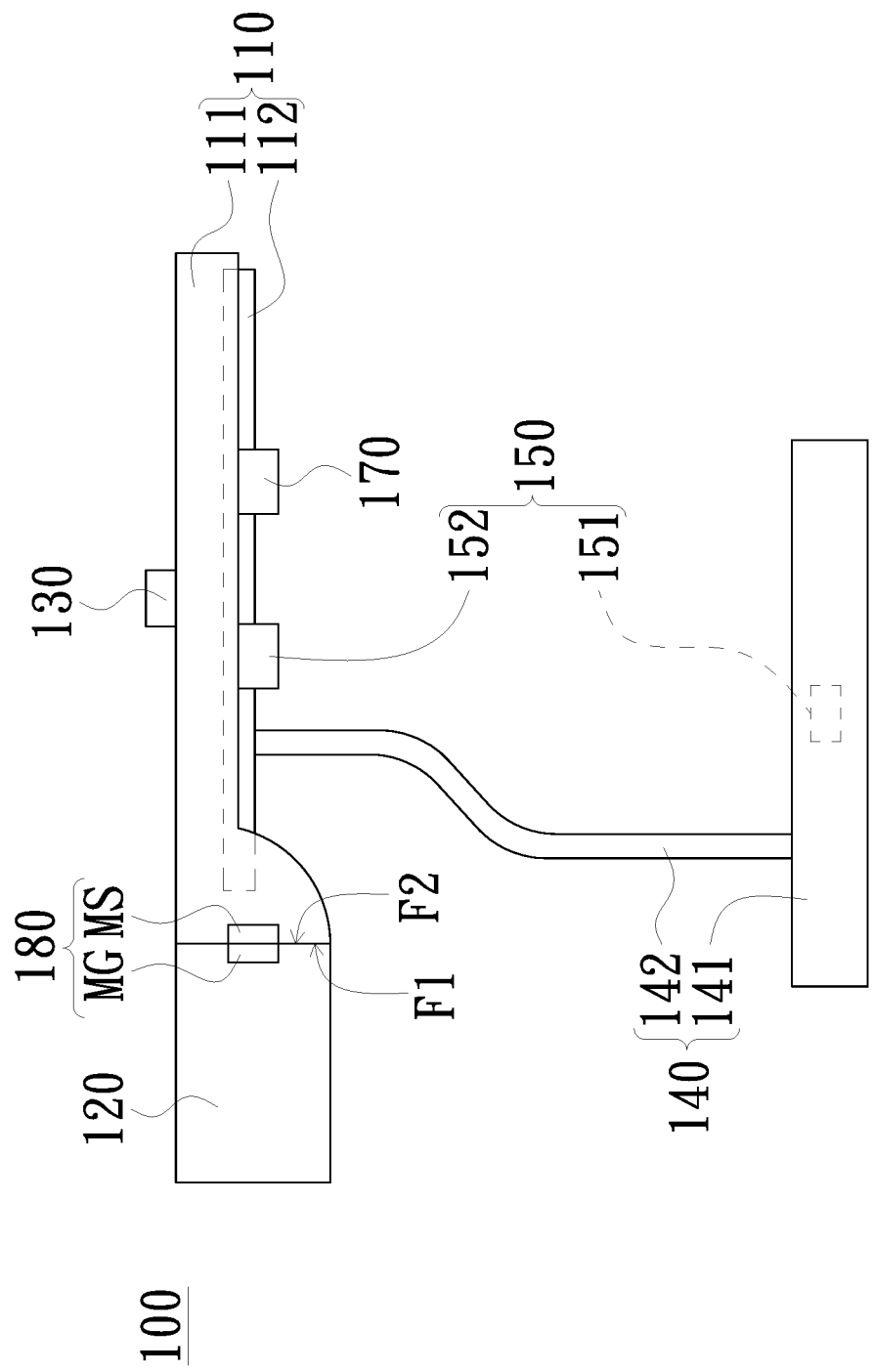
FIG. 2A is a schematic cross-sectional diagram of the smart lighting device shown in FIG. 1A.

FIG. 1A is a schematic diagram showing a state of use of a smart lighting device according to an embodiment of the invention. FIG. 2A is a schematic cross sectional diagram of the smart lighting device shown in FIG. 1A. Referring to FIGS. 1A and 2A, the smart lighting device comprises an illumination module 110, an image projection module 120, and a projection mode switching module 180. The image projection module 120 is pivoted to the illumination module 110. The image projection module 120 is rotated with respect to the illumination module 110, and is switched between a standby mode and a plurality of operation modes. In the embodiment, the plurality of operation modes can be, for example, various different projection modes. The projection mode switching module 180 is disposed between the illumination module 110 and the image projection module 120. The projection mode switching module 180 is configured to detect a rotation angle of the image projection module 120 with respect to the rotation of the illumination module 110, and a brightness value of the illumination module 110 and parameter values of an image frame M projected by the image projection module 120 can be adjusted in accordance with the above rotation angle.

In the present embodiment, the brightness value of the illumination module 110 and the parameters of an image frame M projected by the image projection module 120 can be adjusted by the projection mode switching module 180 according to the detected rotation angle of the image projection module 120 with respect to the illumination module 110. In another embodiment, the brightness value of the illumination module 110 and the parameters of an image frame M projected by the image projection module 120 can be adjusted by a processing module (not shown) according to the detected rotation angle of the image projection module 120 with respect to the illumination module 110. The processing module may be built in the smart lighting device 100, or may be disposed in an external device (for example, a host computer) that is electrically connected to the smart lighting device 100.

The illumination module 110 described above is a lighting module that a brightness thereof is adjustable, and it may comprise, for example, a lamp housing 111 and a light source 112 fixed to the lamp housing 111. The light source 112 may be a light emitting diode (LED) light source or other suitable light sources. The illumination module 110 may be used to form an illumination area R1 on the bearing surface C for bearing the smart lighting device 100. The contour of the illumination area R1 in FIG. 1A is only for the purpose of illustration and is not used to limit the present invention. In addition, the image projection module 120 comprises, for example, a housing 121, a light source (not shown) disposed in the housing 121, a display element (not shown), and a projection lens 122. The housing 121 is, for example, pivoted to the lamp housing 111. The light source is a light source that brightness thereof is adjustable, such as a light-emitting diode (LED) light source, a laser light source, or other suitable light sources. The display element may be a transmissive liquid crystal panel, a liquid crystal on silicon panel (LCoS panel), a digital micro-mirror device (DMD), or other types of display elements. The display element is configured to convert an illumination light beam provided by from the light source into an image beam, and the projection lens 122 is configured to project the image beam onto the surface to form the image frame M. Using FIG. 1A as an example, the projection lens 122 may project the image beam onto a bearing surface C for bearing the smart lighting device 100. Since the image projection module 120 is pivoted to the illumination module 110, the image projection module 120 is thus rotatable to change a direction of the projection, so that the image projection module 120 may project the image beam to surfaces other than the bearing surface C, such as a wall surface of a sidewall, a screen on a wall, a ceiling or the like. Specifically, the image projection module 120 may comprise a plurality of projection modes such as a bearing surface projection mode and at least one wall surface projection mode, wherein the image beam is projected onto the bearing surface C in the bearing surface projection mode, and the at least one wall projection mode comprises a sidewall projection mode for projecting the image beam onto the sidewall (a wall surface or a screen on the wall surface) and a ceiling projection mode for projecting the image beam onto the ceiling.

The detailed configuration of the projection mode switching module 180 of the present embodiment will be further described as follows.

Figure 3:
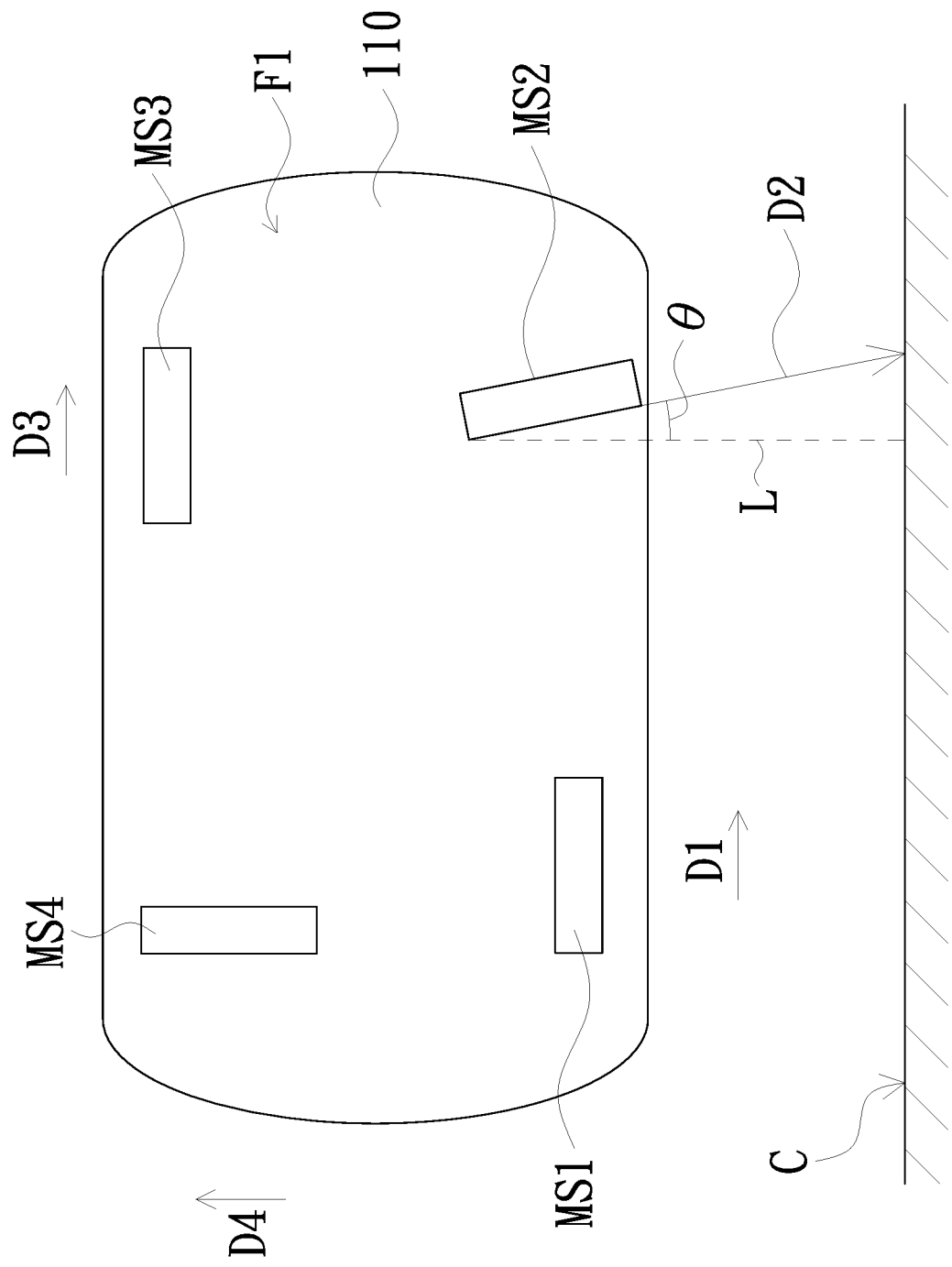
FIG. 3 is a schematic cross-sectional diagram of an illumination module of the present embodiment.
Figure 4:
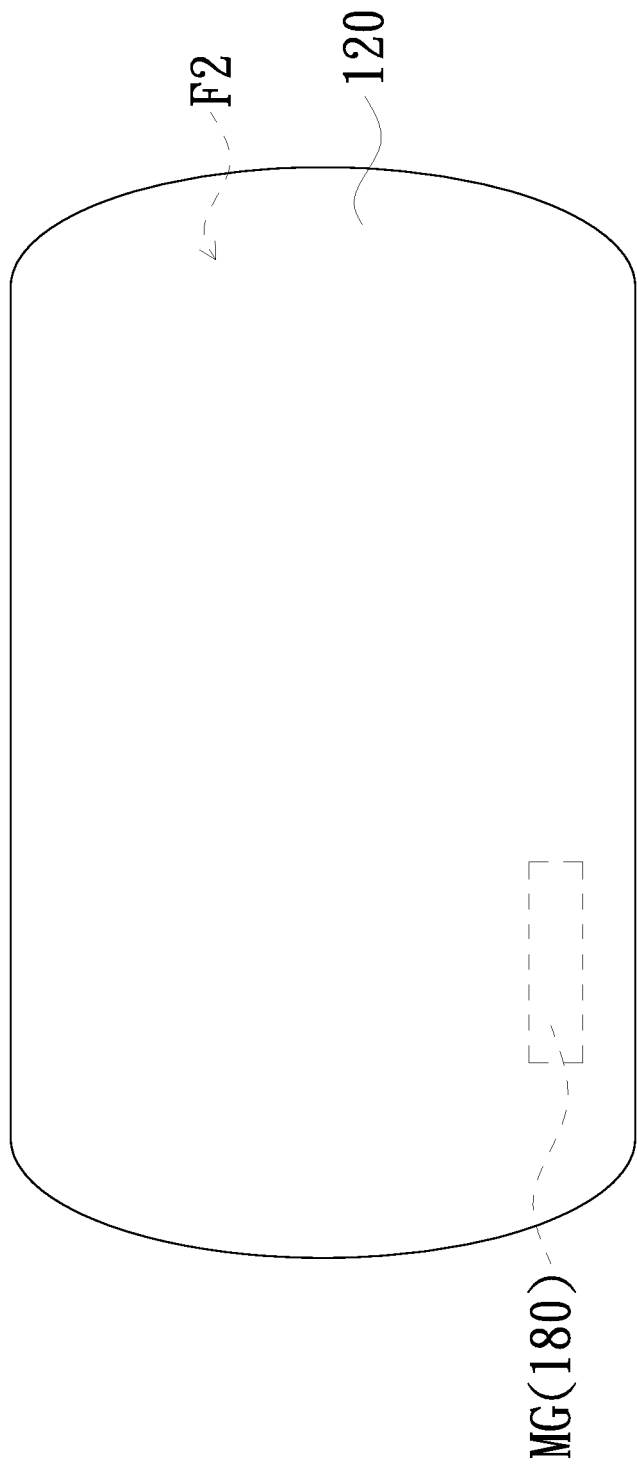
FIG. 4 is a schematic cross-sectional diagram of an image projection module of the present embodiment.

Referring to FIGS. 3 and 4. FIG. 3 is a schematic side view of the illumination module 110 of the present embodiment. FIG. 4 is a schematic side view of the image projection module 120 of the present embodiment. As shown in FIGS. 3 and 4, the illumination module 110 comprises a first engagement surface F1, and the image projection module 120 comprises a second engagement surface F2 opposite to the first engagement surface F1. The projection mode switching module 180 of the present embodiment is disposed on the first engagement surface F1 of the illumination module 110 and the second engagement surface F2 of the image projection module 120, and comprises at least one sensing emission element and a sensing element. Specifically, the sensing element of the projection mode switching module 180 can be a magnetic sensing element MS and the sensing element is a magnetic element MG. In the present embodiment, the magnetic element MG can be, for example, a permanent magnet, and the number of the magnetic sensing element MS is four for the purpose of illustration, so that the projection mode switching module 180 comprises a first magnetic sensing element MS1, a second magnetic sensing element MS2, a third magnetic sensing element MS3, and a fourth magnetic sensing element MS4, but the present invention does not limit the number of magnetic sensing elements, and the number of the magnetic sensing elements MS can be adjusted with respect to the number of operation modes of the image projection module 120.

As shown in FIG. 3, the first magnetic sensing element MS1, the second magnetic sensing element MS2, the third magnetic sensing element MS3, and the fourth magnetic sensing element MS4 of the projection mode switching module 180 are respectively disposed on the first engagement surface F1 of the illumination module 110, and the first magnetic sensing element MS1, the second magnetic sensing element MS2, the third magnetic sensing element MS3, and the fourth magnetic sensing element MS4 are disposed on different positions of the first engagement surface F1. In the present embodiment, the first magnetic sensing element MS1, the second magnetic sensing element MS2, the third magnetic sensing element MS3, and the fourth magnetic sensing element MS4 are, for example, respectively disposed on a place near four corners of the first engagement surface F1. As shown in FIG. 4, the magnetic element MG of the projection mode switching module 180 is disposed on the second engagement surface F2 of the image projection module 120. It is noted that an extension direction D1 of the first magnetic sensing element MS1 and an extension direction D3 of the third magnetic sensing element MS3 of the present embodiment can be, for example, respectively parallel to the bearing surface C. For example, the second magnetic sensing element MS2 and a reference line L perpendicular to the bearing surface C may have an included angle θ therebetween, and the angle θ can be 5 to 15 degrees. An extension direction D4 of the fourth magnetic sensing element MS4 can be, for example, perpendicular to the bearing surface C.

Figure 2B:
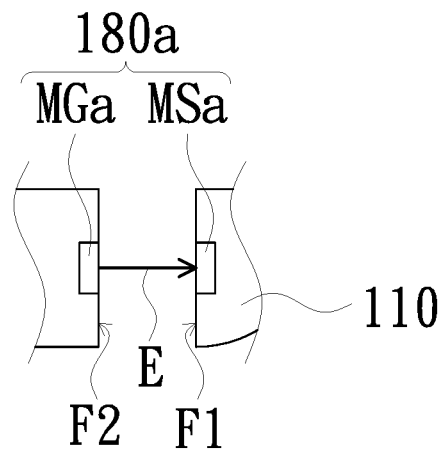
FIG. 2B is a schematic structural diagram showing a projection mode switching module according to another embodiment of the invention.

The locations for disposing the first magnetic sensing element MS1, the second magnetic sensing element MS2, the third magnetic sensing element MS3, the fourth magnetic sensing element MS4, and the magnetic element MG disclosed above merely show one of the embodiments of the present invention. In another embodiment, the first magnetic sensing element MS1, the second magnetic sensing element MS2, the third magnetic sensing element MS3, and the fourth magnetic sensing element MS4 can be, for example, disposed on the second engagement surface F2 of the image projection module 120, and the magnetic element MG can be, for example, disposed on the first engagement surface F1 of the illumination module 110. Moreover, in addition to the magnetic sensing projection mode switching module 180 described above, the projection mode switching module 180 can be, for example, a magnetic reed projection mode switching module, and the projection mode switching module 180 can be, for example, a Hall projection mode switching module in another embodiment. In yet another embodiment, as shown in FIG. 2B, the projection mode switching module 180a can be, for example, an optical projection mode switching module, and the projection mode switching module 180a comprises an optical sensing element MSa and an optical sensing emission element MGa. In the present embodiment, the optical sensing element MSa comprises four optical sensing elements (i.e., elements similar to the configuration of the first magnetic sensing element MS1, the second magnetic sensing element MS2, the arrangement of the third magnetic sensing elements MS3 and the fourth magnetic sensing element MS4 shown in FIG. 2A), and these four optical sensing elements respectively may receive the light source signal E emitted from the optical sensing emission element MGa at different relative positions via rotating the relative positions of the image projection module 120 with respect to the illumination module 110, thereby switching the projection modes of the projection mode of the projection module 120.

Figure 2C:
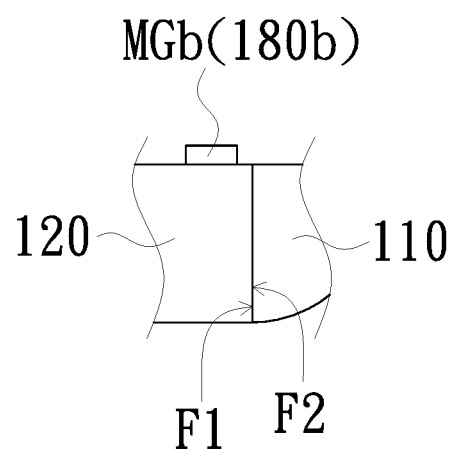
FIG. 2C is a schematic structural diagram showing a projection mode switching module according to yet another embodiment of the invention.

In yet another embodiment, as shown in FIG. 2C, the projection mode switching module 180b may comprise, for example, a gyrometer projection mode switching module 180b, and the gyrometer MGb of the gyrometer projection mode switching module 180b can be disposed on any suitable position of the image projection module 120 and is not restricted to be disposed on the first engagement surface F1 and the second engagement surface F2. The gyrometer MGb can detect and transmit an angular signal of the relative position of the image projection module 120 via rotating the relative position angle between the image projection module 120 with respect to the illumination module 110, thereby switching the projection mode of the projection module 120.

Figure 5A:
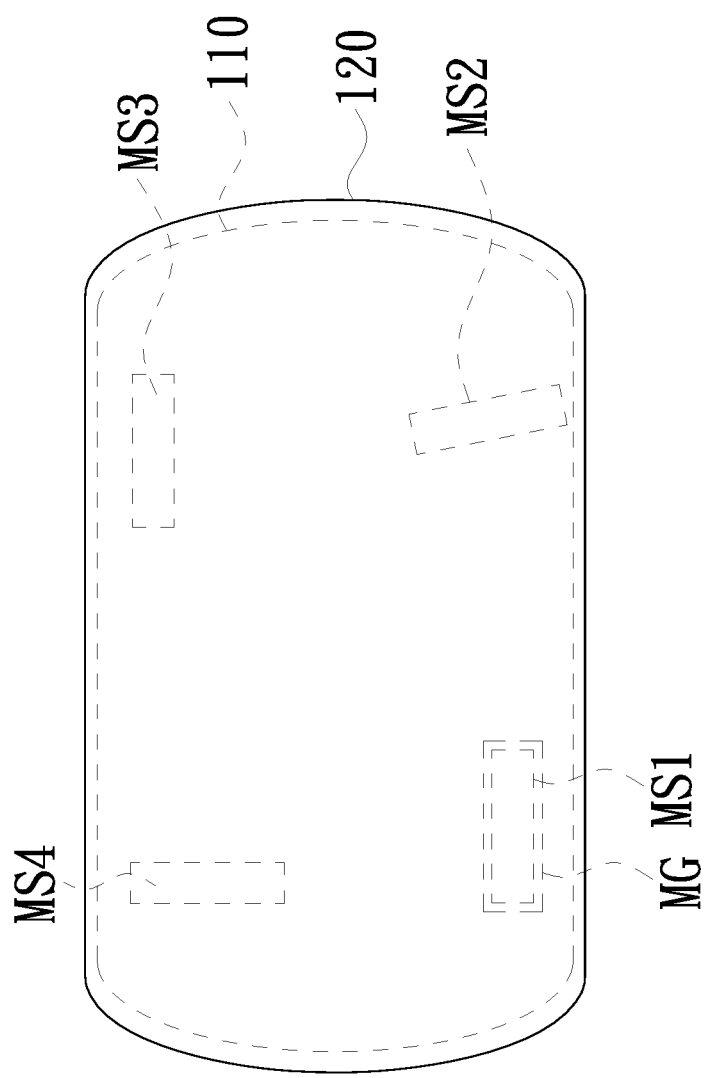
FIG. 5A is a schematic structural diagram of an image projection module in a stand-by mode of the present embodiment.
Figure 5B:
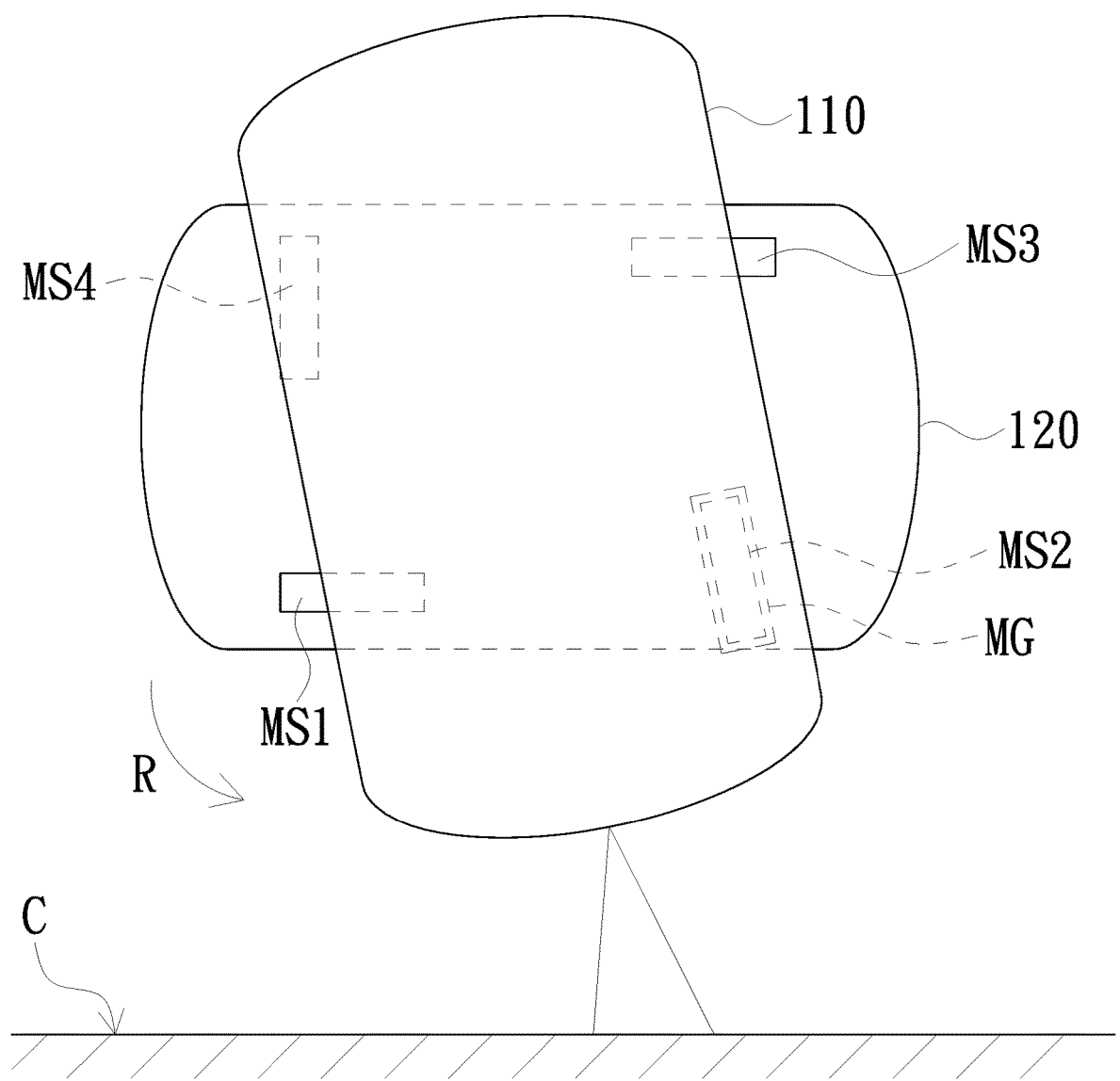
FIG. 5B is a schematic structural diagram of an image projection module in a bearing surface projection mode of the present embodiment.
Figure 5C:
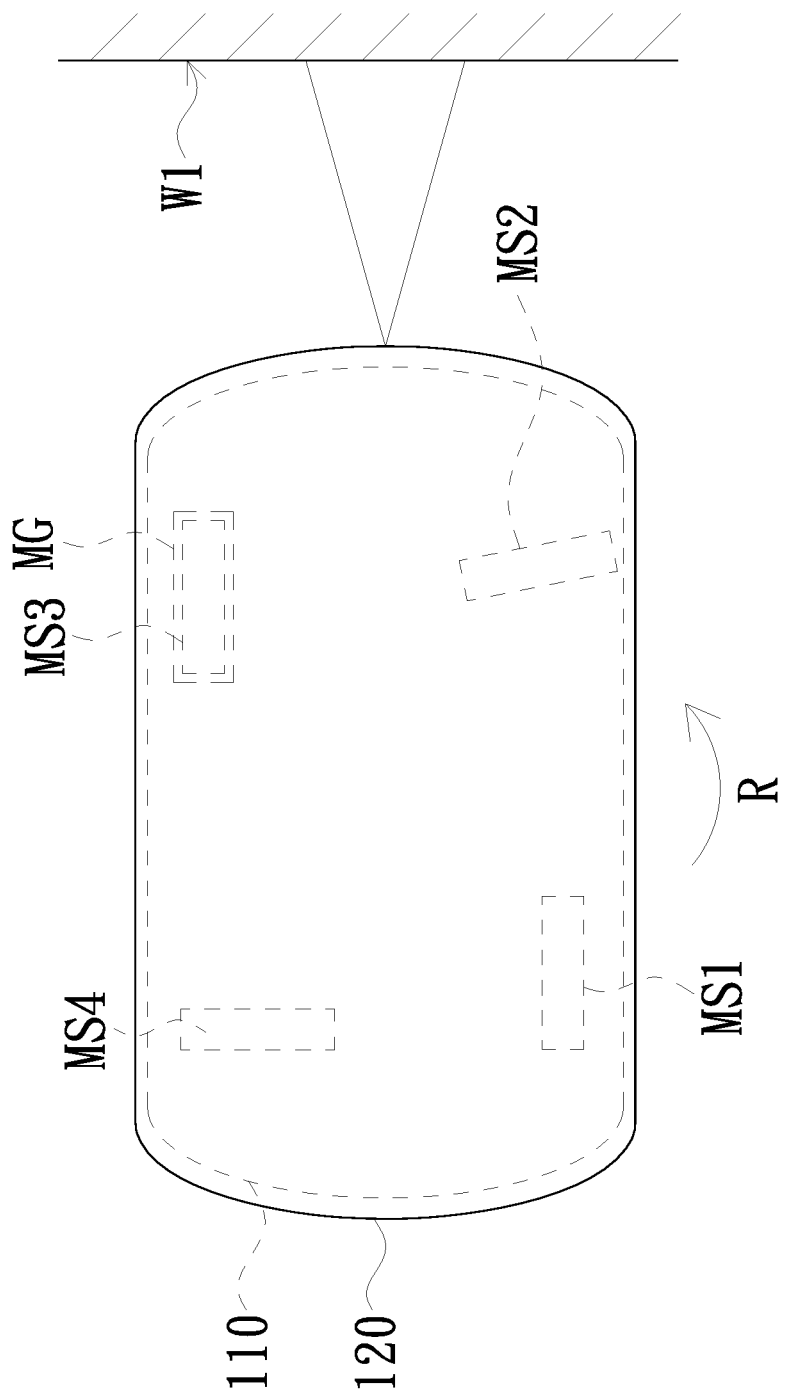
FIG. 5C is a schematic structural diagram of an image projection module in a sidewall projection mode of the present embodiment.
Figure 5D:
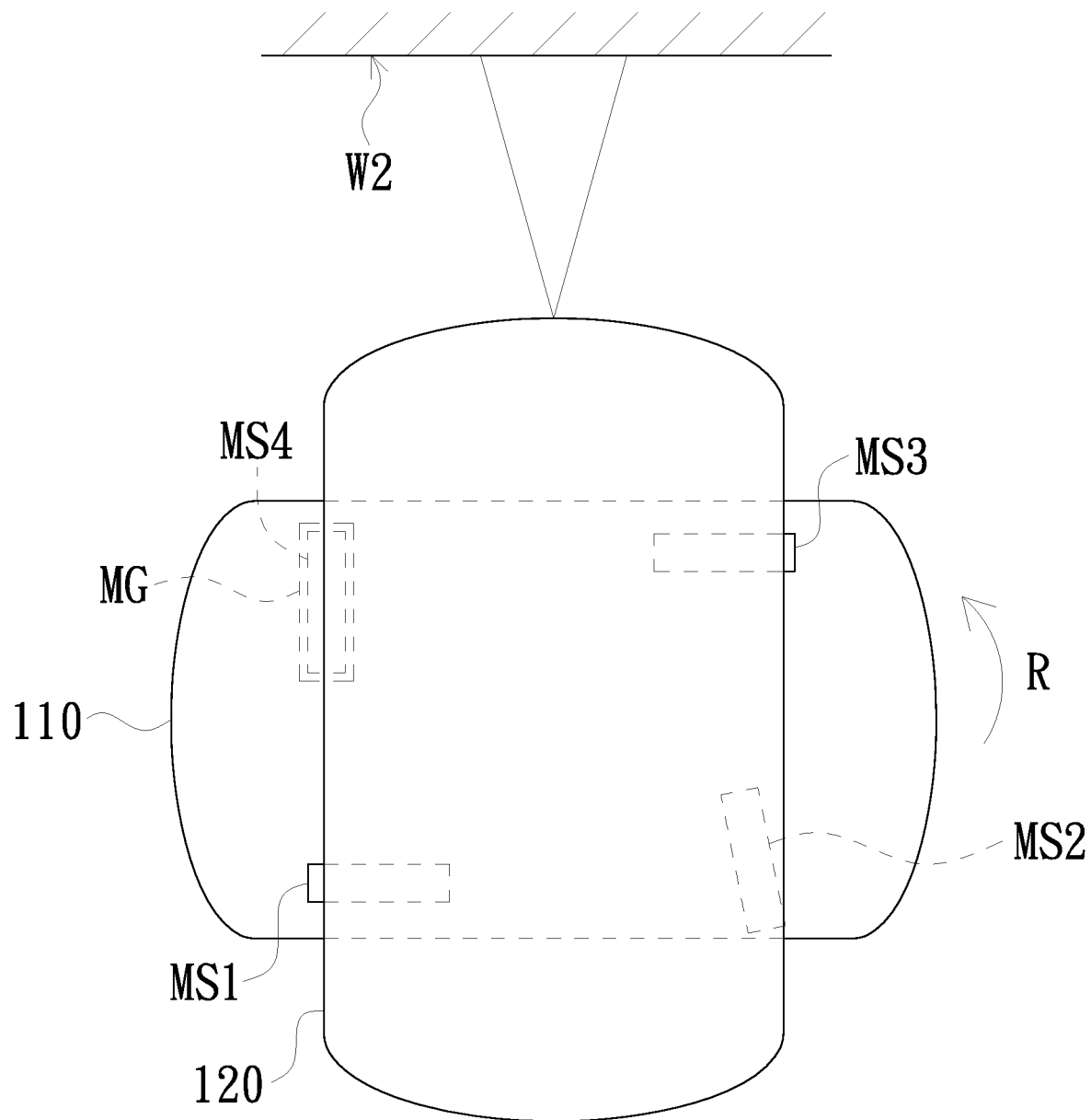
FIG. 5D is a schematic structural diagram of an image projection module in a ceiling projection mode of the present embodiment.

Referring to FIGS. 5A to 5D, wherein FIG. 5A is a schematic structural view showing the image projection module 120 of the present embodiment in a standby mode. FIG. 5B is a schematic structural view of the image projection module 120 of the present embodiment in a bearing surface projection mode. FIG. 5C is a schematic structural view of the image projection module 120 of the present embodiment in a sidewall projection mode. FIG. 5D is a schematic structural view of the image projection module 120 of the present embodiment in a ceiling projection mode. As shown in FIG. 5A, when the image projection module 120 is in the standby mode, which means that the image projection module 120 is not rotated and is not in any of the projection modes, and the location of the magnetic element MG at the first engagement surface F1 is opposite to the location of the first magnetic sensing element MS1 at the second engagement surface F2. At this time, the image projection module 120 is disabled and would not project the image frame M, and the brightness value of the illumination module 110 is adjusted to a first brightness value, such as in a bright state or ambient light source state. As shown in FIG. 5B, when the rotation angle of the image projection module 120 with respect to the illumination module 110 is rotated (for example toward the counterclockwise direction R) to the first angle (for example, a 100-degree rotation), and the image projection module 120 is switched from the standby mode to the bearing surface projection mode, and the location of the magnetic element MG on the first engagement surface F1 is opposite to the position of the second magnetic sensing element MS2 on the second engagement surface F2. At this time, the image projection module 120 is enabled to project the image frame M, and the brightness value of the illumination module 110 is adjusted to a second brightness value that is smaller than or equal to the first brightness value, such as in a dark state or an ambient light source state. Since an extension direction D2 of the second magnetic sensing element MS2 and the bearing surface C has an included angle θ therebetween, so that the image projection module 120 can entirely project the image frame M onto the bearing surface C. However, since the optical axis of the image projection module 120 is not orthogonal to the bearing surface C in the bearing surface projection mode, so the image projection module 120 would adjust the image frame M via, for example, a keystone adjustment. As shown in FIG. 5C, when the rotation angle of the image projection module 120 with respect to the illumination module 110 is rotated (for example, toward the counterclockwise direction R) to the second angle (for example, a 180-degree rotation), and the image projection module 120 is switched from the standby mode to the sidewall projection mode, and the location of the magnetic element MG on the first engagement surface F1 is opposite to the location of the third magnetic sensing element MS3 on the second engagement surface F2. At this time, the image projection module 120 is enabled to project the image frame M, and the brightness value of the illumination module 110 is adjusted to a third brightness value that is greater than or equal to the second brightness value, such as in a bright state or a dark state, since an extension direction D3 of the third magnetic sensing element MS3 is parallel to the bearing surface C. Therefore, the image projection module 120 can project the image frame M onto the wall surface W1 of the sidewall located in front of the projection lens 122. As shown in FIG. 5D, when the rotation angle of the image projection module 120 with respect to the illumination module 110 (for example, toward the counterclockwise direction R) is rotated to the third angle (for example, a 270-degree rotation), and the image projection module 120 is switched from the standby mode to the ceiling projection mode, and the location of the magnetic element MG on the first engagement surface F1 is opposite to the location of the fourth magnetic sensing element MS4 on the second engagement surface F2. At this time, the image projection module 120 is enabled to project the image frame M, and the brightness value of the illumination module 110 is adjusted to a fourth brightness value that is smaller than or equal to of the third brightness value, such as in a dark state or an off state. Since an extension direction D4 of the fourth magnetic sensing element MS4 is vertical to the bearing surface C, so that the image projection module 120 can project the image frame M onto the wall surface W2 of the ceiling located above the projection lens 122.

It is to be noted that when the image projection module 120 is in the sidewall projection mode or the ceiling projection mode, once the optical axis of the image projection module 120 is vertical to the bearing surface C, then the image projection module 120 would not adjust the image frame. In addition, when the image projection module 120 is in the sidewall projection mode or the ceiling projection mode, and the optical axis of the image projection module 120 is not vertical to the bearing surface C, and the image projection module 120 would adjust the image frame M via, for example, keystone corrections and brightness adjustments. In addition, based on safety considerations while using a laser source as a light source of the image projection module 120, in the embodiments described above, when the image projection module 120 is rotated between two different projection modes, the projection mode switching module 180 transmits the signals received by the sensing elements to the processing module, and the processing module can disable or adjust the laser light source to a low energy state to prevent damages to the eyes of the users or crowd due to rotation of the image projection module 120.

As shown in FIGS. 1A and 2A, the smart lighting device 100 described above may further comprise a support body 140, and the support body 140 is configured to be mounted on the bearing surface C. The illumination module 110 is connected to the support body 140 and is opposite to the bearing surface C to illuminate the bearing surface C. Specifically, the support body 140 comprises, for example, a base 141 configured to connect the bearing surface C and a support frame 142 connected to the base 141, and the illumination module 110 is connected to the support frame 142. The light sensing module 130 can be disposed on, for example, the side of the illumination module 110 away from the bearing surface C, but the number and the location of the light sensing elements of the light sensing module 130 may vary and depend on the design requirements and are not limited to those shown in FIG. 1A and FIG. 2A. In addition, the light sensing module 130 can be formed by one or several ambient light sensing elements, or it can be formed by one or several ambient light sensing elements and a photosensitive element of the camera module.

The smart lighting device 100 may further include a sensing module 150 used as an input device, and the sensing module 150 may be electrically connected to the processing module described above. The sensing module 150 may be an optical sensing module, an acoustic sensing module, or a touch sensing module. The optical sensing module may include an invisible light emitting element and a receiving element, such as an infrared or far infrared ray emitting element and a receiving element, and the acoustic sensing module may comprise an ultrasonic transmitting element and a receiving element, and the touch sensing module may include a resistive or capacitive touchpad. In one embodiment, the sensing module 150 is an optical sensing module that includes a light emitting element 151 and a light receiving element 152. The light emitting element 151 and the light receiving element 152 are, for example, electrically connected to the processing module described above. The light emitting element 151 can be disposed on the base 151 as shown in FIG. 1A, or can be disposed on the illumination module 110 or on other suitable locations. The light emitting element 151 is used to form a sensing region R2 on the bearing surface C for bearing the smart lighting device 100. The sensing area R2 includes, for example, the entire image frame M. The contour of the sensing area R2 shown in FIG. 1A is only the purpose of illustration and the actual contour of the sensing area R2 is not limited to that shown in FIG. 1A. In the embodiment of the optical sensing module, the sensing area R2 can be, for example, with a shape formed by the emissive element 151 which expands outwardly, and the actual sensing area R2 varies depending on the location where the light emitting element 151 is disposed. Shapes of the sensing area R2 varies with respect to different types of sensing, as long as the sensing area R2 is large enough to cover the entire image frame M. The light receiving element 152 is disposed on the illumination module 110 and the sensing field of the light receiving element 152 covers the sensing area R2 for sensing the user's touch action. The light emitting element 151 emits, for example, invisible light, and the light receiving element 152 receives the invisible light emitted from the light emitting element 151. In this embodiment, the light emitting element 151 is an infrared light emitting element, and the light receiving element 152 is an infrared light receiving element.

Figure 1B:
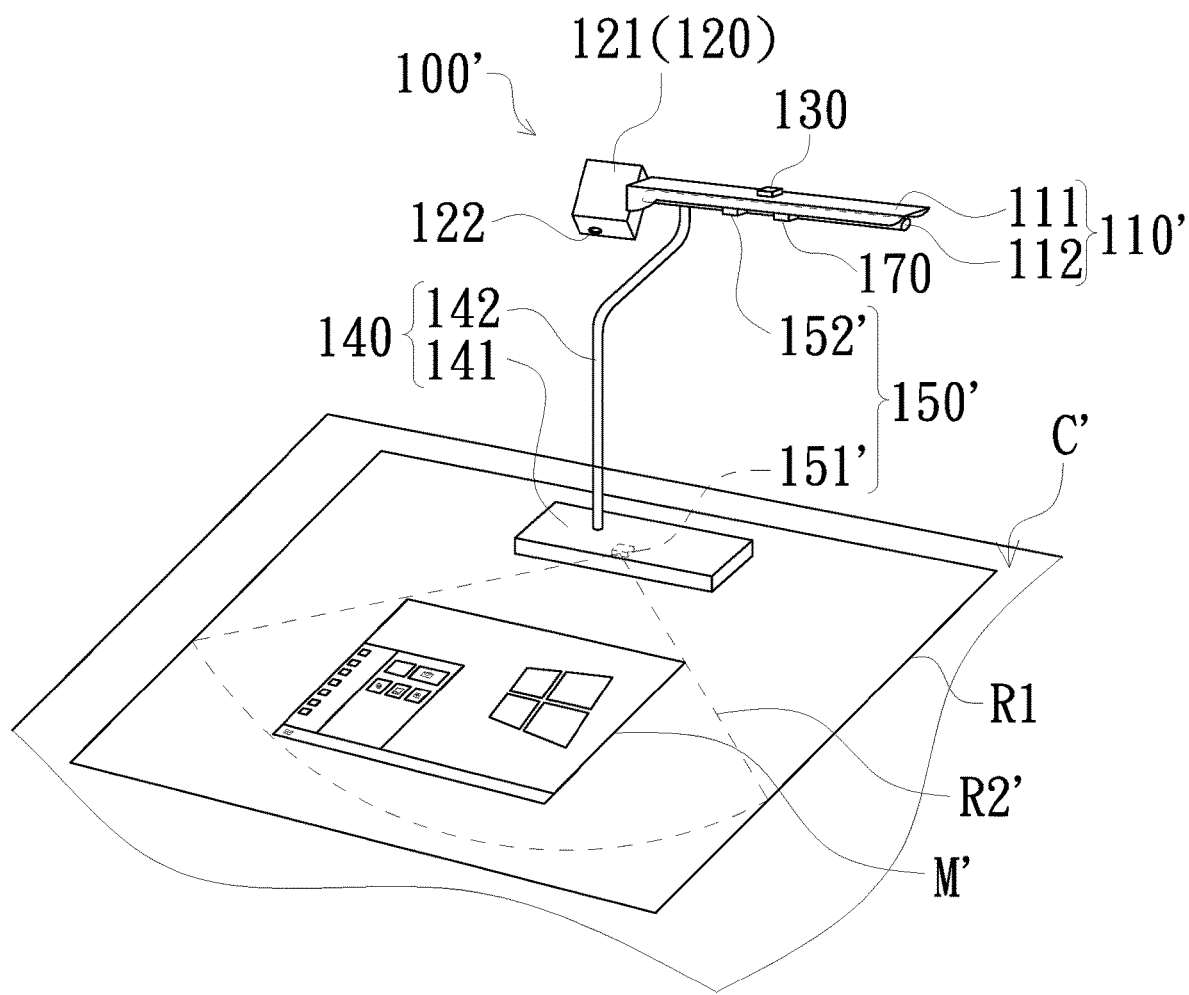
FIG. 1B is a schematic diagram showing a state of use of a smart lighting device according to another embodiment of the invention.

In another embodiment, as shown in FIG. 1B, the sensing control module 150' is an acoustic sensing module which comprises an ultrasonic transmitting element 151' and an ultrasonic receiving element 152'. The ultrasonic transmitting element 151' and the ultrasonic receiving element 152' can be, for example, electrically connected to the processing module described above. The ultrasonic emitting element 151' can be disposed on the base 151' as shown in FIG. 1B, or it can be disposed on the illumination module 110' or other suitable locations. The ultrasonic transmitting element 151' is configured to form a sensing area R2' on the bearing surface C' for bearing the smart lighting device 100'. The sensing area R2' can cover, for example, the entire image frame M'. The contour of the sensing area R2' in FIG. 1B is only for the purpose of illustration and the actual contour of the sensing area R2' is not limited to that shown in FIG. 1B. The ultrasonic receiving element 152' is disposed on the illumination module 110', and a sensing field of the ultrasonic receiving element 152' covers the sensing area R2' to sense the user's touching actions in the sensing area R2'.

Referring again to FIG. 1A, the sensing module 150 comprises, for example, an absolute coordinate mode and a relative coordinate mode. When the surface projected by the image projection module 120 forms the sensing area, the sensing module 150 can be switched to the absolute coordinate mode. For example, when the image projection module 120 is switched to the bearing surface projection mode, the sensing module 150 can be switched to the absolute coordinate mode. Thus, a user can directly perform various operations (for example, clicking or inputting on the virtual keyboard) on the image frame M projected by the image projection module 120, thereby having an effect similar to a touch screen.

On the other hand, when the image projection module 120 cannot project within the sensing area, the sensing module 150 can be switched to the relative coordinate mode. For example, when the image projection module 120 is switched to various wall surface projection modes, the sensing module 150 can be switched to the relative coordinate mode. Thus, the sensing module 150 can sense the user's manipulation gestures and performs a cursor manipulation. In one embodiment, the mode switching (i.e., switching to the absolute coordinate mode or the relative coordinate mode) can be performed by the processing module to control the sensing module 150.

It is to be noted that the sensing steering module 150 described above can be enabled when the image projection module 120 is in the standby mode or various operation modes, which means the sensing module 150 of the present embodiment is operational in various modes. In addition, the sensing module 150 can also be turned on and off in various modes by a manual manner.

In another embodiment, the sensing module can be an image sensing capable of sensing a color image, thereby sensing a user's manipulation gestures.

Figure 1C:
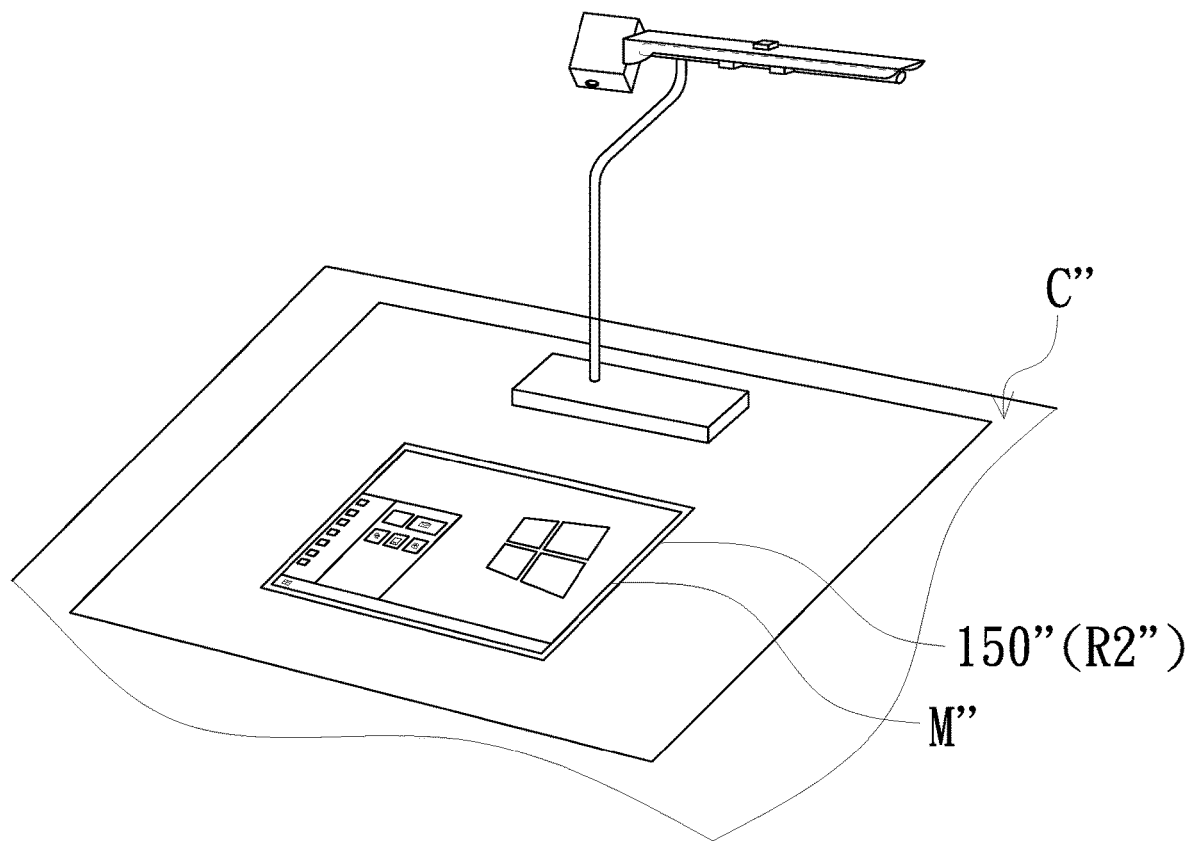
FIG. 1C is a schematic diagram showing a state of use of a smart lighting device according to yet another embodiment of the invention.

In yet another embodiment, as shown in FIG. 1C, the sensing module 150" is a touch sensing module, which can be a touchpad comprising resistive or capacitive touch elements. The sensing module 150" can be disposed on the bearing surface C", and the image frame M" can be projected within the range of the sensing module 150", and the sensing surface of the sensing module 150" is the sensing area R2".

In yet another embodiment, the smart lighting device 100 can also be connected to other input devices, such as a keyboard, an indicator device (e.g., a mouse, or a stylus), etc., and is not limited to uses of the sensing module.

The smart lighting device 100 may further comprise a camera module 170 that is electrically connected to the processing module for capturing images of an object, and the operation mode of the smart lighting device 100 further comprises a shooting mode. The camera module 170 comprises, for example, at least one image capturing element and photosensitive element (not shown) thereof, wherein the photosensitive element can be, for example, a CMOS image sensor, a charge coupled device (CCD) or other kinds of photosensitive elements. The camera module 170 can be disposed on, for example, the light housing 111, but it can also be disposed in other suitable locations.

In the following, a smart lighting device having a processing module is used as an example to further describe how the brightness value of the illumination module 110 and parameter values of the image frame M projected by the image projection module 120 are adjusted in accordance with the rotation angle of the image projection module 120 with respect to the illumination module 110 as detected by the projection mode switching module 180.

Figure 6:
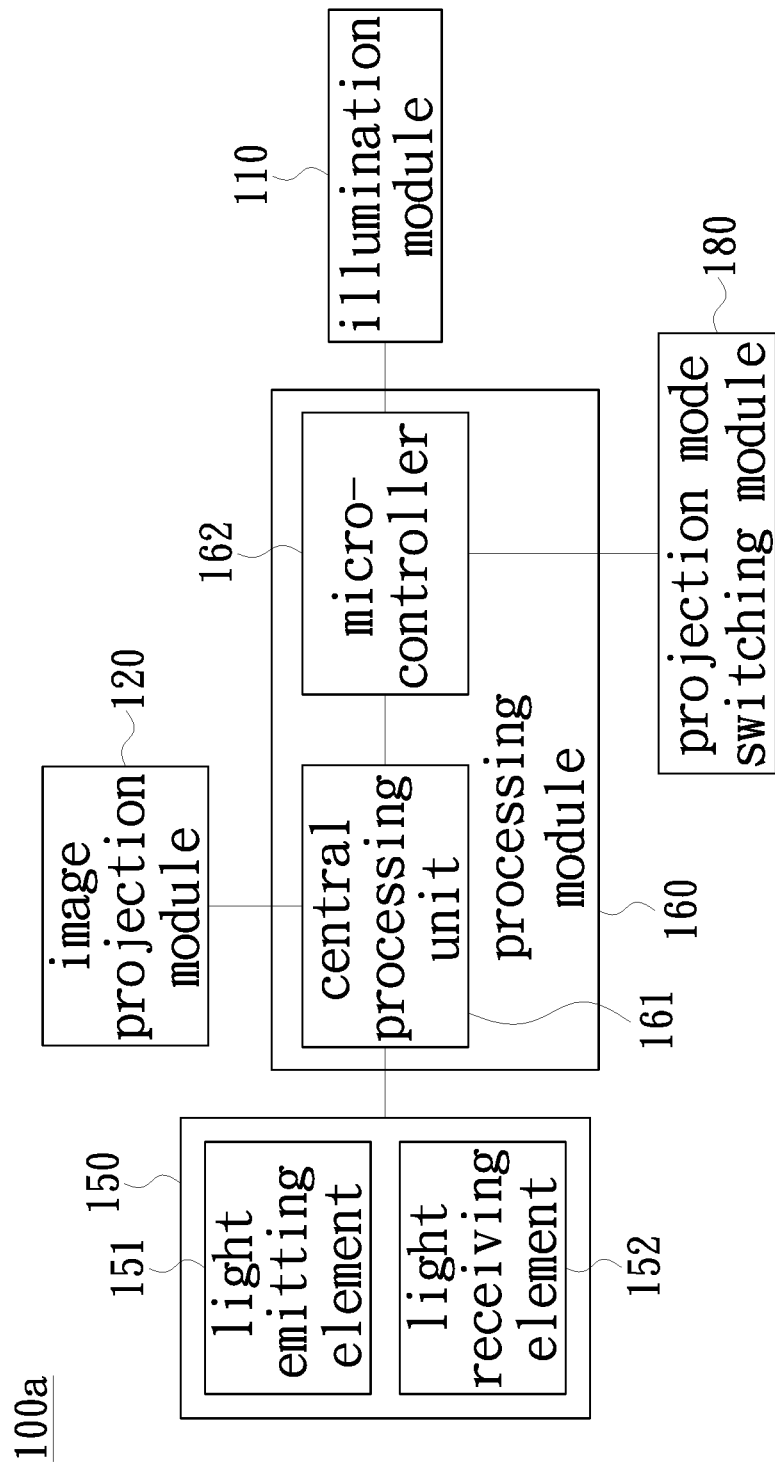
FIG. 6 is a schematic function block diagram of a smart lighting device according to an embodiment of the invention.

Please refer to FIG. 6, which is a functional block diagram of a smart lighting device according to another embodiment of the present invention. Please also refer to FIGS. 1A to 5D, at the same time, the smart lighting device 100a of the present embodiment further comprises a processing module 160 as compared with the smart lighting device 100 described above. The processing module 160 can be electrically connected to the illumination module 110 and the projection mode switching module 180. The processing module 160 can be, for example, disposed within the base 141, but the present invention does not limit the location of the processing module 160. The projection mode switching module 180 can be electrically connected to the illumination module 110 and the image projection module 120 via the processing module 160, and the processing module 160 can adjust the brightness value of the illumination module 110 and parameter values of the image frame M projected by the image projection module 120 in accordance with the rotation angle detected by the projection mode switching module 180.

For example, when the image projection module 120 is in the standby mode, that is, the position in which the image projection module 120 has yet been rotated and is not in any of the projection modes, and the location of the magnetic element MG is located on the first engagement surface F1 opposite to the location of the first magnetic sensing element MS1 on the second engagement surface F2. At this time, the second magnetic sensing element MS2 senses and receives the magnetic force generated from the magnetic element MG to form a sensing signal, and the processing module 160 receives the sensing signal from the second magnetic sensing element MS2 and generates a disable signal, and the image projection module 120 receives the disable signal transmitted from the processing module 160 and would not project the image frame M. When the rotation angle of the image projection module 120 with respect to the illumination module 110 is the first angle and the image projection module 120 is switched from the standby mode to the bearing surface projection mode, the location of the magnetic element MG located on the first engagement surface F1 is opposite to the location of the second magnetic sensing element MS2 located on the second engagement surface F2. At this time, the second magnetic sensing element MS2 senses and receives the magnetic force generated by the magnetic element MG to generate a sensing signal and the processing module 160 receives the sensing signal from the second magnetic sensing element MS2 to generate an image signal, and the image projection module 120 receives the image signal transmitted from the processing module 160 and then project the image frame M. Similarly, when the image projection module 120 is in the sidewall projection mode or the ceiling projection mode, it is also controlled by the processing module 160.

The processing module 160 described above comprises a central processing unit 161 and a micro-controller 162. The central processing unit 161 can be electrically connected to the micro-controller 162. The central processing unit 161 can be electrically connected to the image projection module 120, and the micro-controller 162 can be electrically connected to the illumination module 110 and the projection mode switching module 180. The projection mode switching module 180 can be electrically connected to the central processing unit 161 via the micro-controller 162. In the present embodiment, the image projection module 120 can be controlled by the central processing unit 161, and the illumination module 110 can be controlled by the micro-controller 162, and a mode switching signal generated by the projection mode switching module 180 can be transmitted to the central processing unit 161 by the micro-controller 162. In addition, the central processing unit 161 may also control the sensing module 150. In another embodiment, the illumination module 110, the image projection module 120, the projection mode switching module 180, and the sensing steering module 150 may also be independently controlled by the central processing unit 161.

Referring again to FIG. 1A, the smart lighting device 100 of the present embodiment comprises an illumination module 110, an image projection module 120, and a light sensing module 130. The image projection module 120 is pivoted to the illumination module 110, and the light sensing module 130 is electrically connected to the illumination module 110 and the image projection module 120. The light sensing module 130 is configured to sense the brightness value of the ambient light, and the brightness values of the illumination module 110 and the image projection module 120 is adjusted in accordance with the brightness value of the ambient light sensed by the light sensing module 130 and the projection mode of the image projection module 120.

Figure 7:
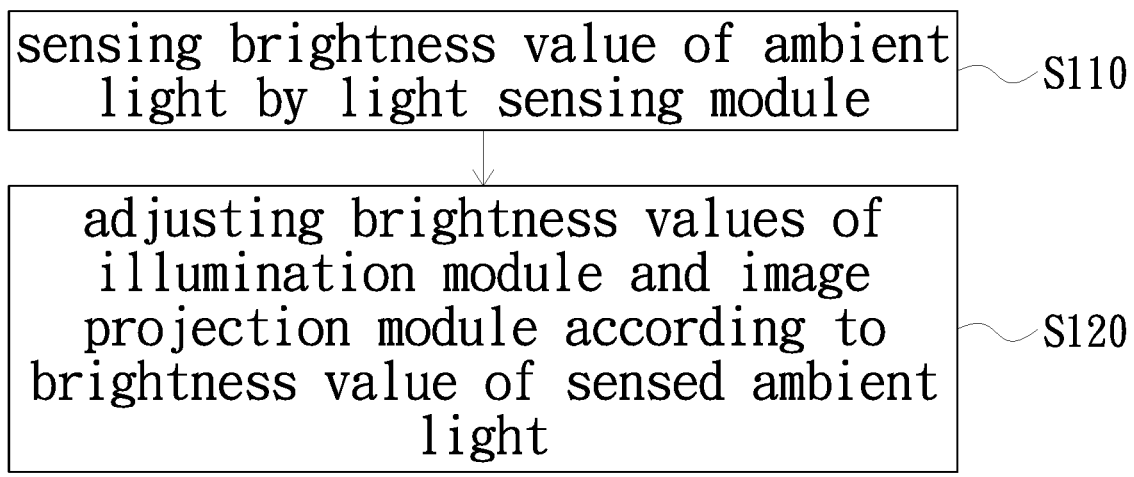
FIG. 7 is a flow chart diagram of a control method of a smart lighting device according to an embodiment of the invention.

FIG. 7 is a flowchart of a control method of a smart lighting device according to an embodiment of the present invention. Referring to FIGS. 1A and 7, the control method of the smart lighting device of the present embodiment is applicable to the smart lighting device 100 described above and may comprise following steps. As shown in the step S110, a brightness value of the ambient light is sensed by the light sensing module 130. The ambient light may comprise daylight, artificial light, and reflection light of objects such as reflection light from wall surfaces and reflection light from the bearing surface C. Next, as shown in the step S120, the brightness values of the illumination module 110 and the image projection module 120 are adjusted according to the brightness value of the sensed ambient light. In the step S120, the brightness values of the illumination module 110 and the image projection module 120 are simultaneously adjusted in accordance with the projection mode of the image projection module 120.

Since the brightness value of the ambient light is sensed by the light sensing module 130, so that the brightness values of the illumination module 110 and the image projection module 120 can be adjusted according to the brightness value of the ambient light sensed by the light sensing module 130 and the projection mode of the image projection module 120 to provide the user with more comfortable experience. For example, when the brightness value of the ambient light is insufficient, the light can be supplemented by the illumination module 110, and the brightness value of the image projection module 120 is correspondingly adjusted so as to prevent the image from being too dazzling, thereby providing the user with a more comfortable experience. In one embodiment, the light sensing module 130 may adjust the brightness values of the illumination module 110 and the image projection module 120 in accordance with the brightness values of the sensed ambient light and the projection mode of the image projection module 120. In another embodiment, the illumination module 110 and the brightness value of the image projection module 120 may be adjusted by the processing module (not shown) in accordance with the brightness value of the ambient light sensed by the light sensing module 130 and the projection mode of the video projection module 120. The processing module may be built in the smart lighting device 100, or may be disposed in an external device (for example, a host computer) that is electrically connected to the smart lighting device 100.

Figure 8:
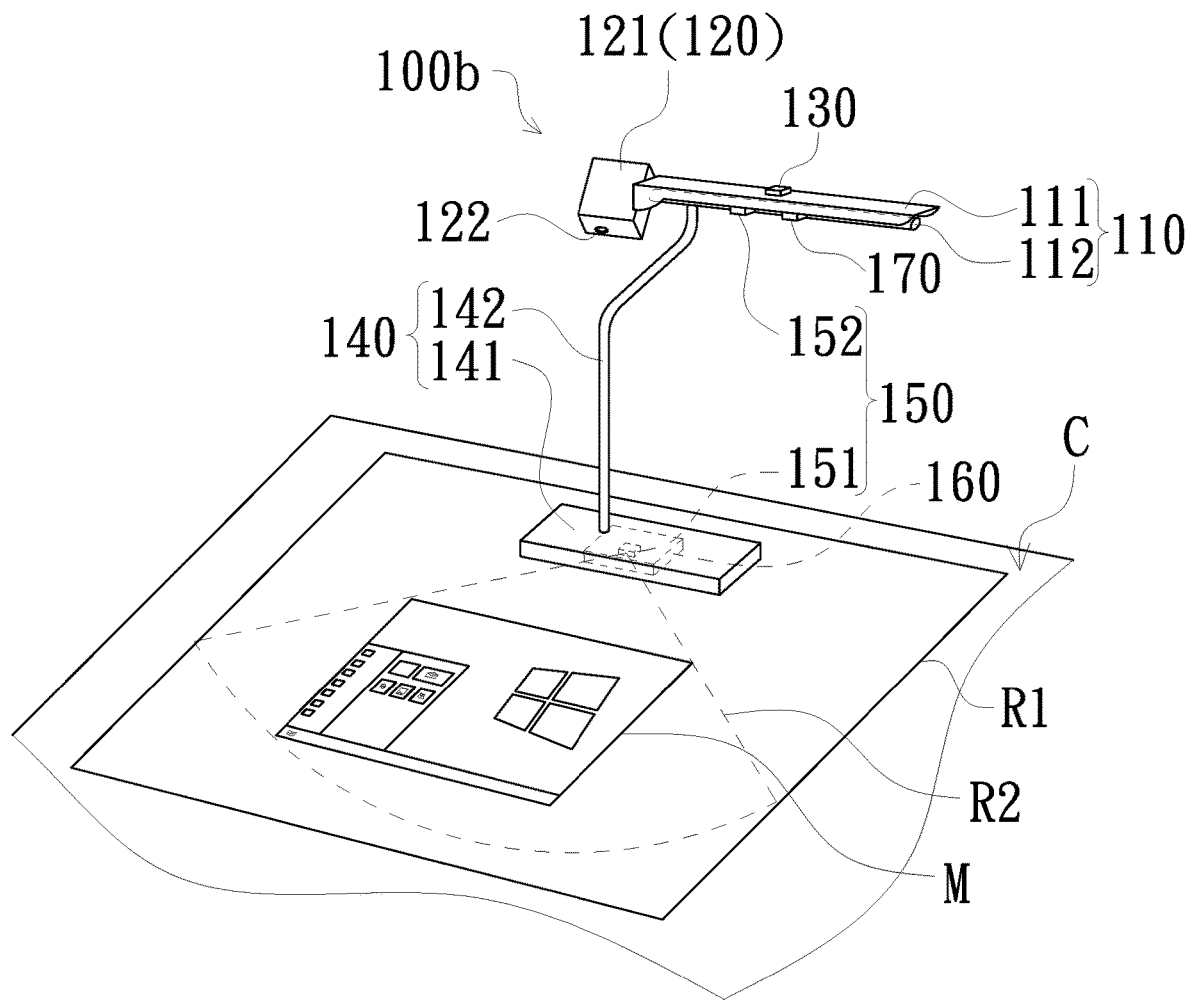
FIG. 8 is a schematic diagram showing a state of use of a smart lighting device according to another embodiment of the invention.
Figure 9:
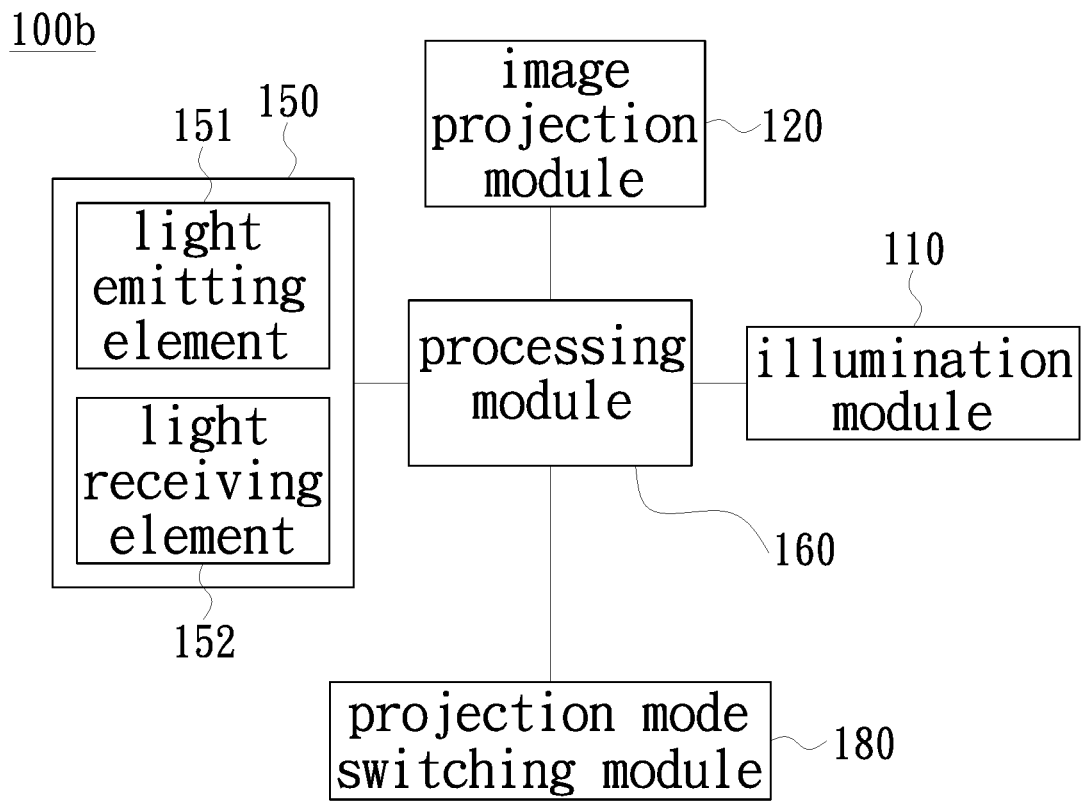
FIG. 9 is a schematic block diagram of the smart lighting device of FIG. 8.

In the following, a smart light device comprising a processing module is used as an example to further describe adjustments to the brightness values of the illumination module 110 and the image projection module 120 based on the brightness value of the ambient light sensed by the light sensing module 130 and the projection mode of the image projection module 120. It is to be noted that although adjustments to the brightness values of the illumination module 110 and the image projection module 120 are achieved in accordance with the brightness value of the ambient light sensed by the light sensing module 130 and the projection mode of the image projection module 120 are used as an example in the following, but adjustments to the brightness values of the illumination module 110 and the image projection module 120 can be directly achieved in accordance with the brightness value of the ambient light sensed by the light sensing module 130 and the projection mode of the image projection module 120 in other embodiments, FIG. 8 is a schematic view showing a state of use of a smart lighting device according to another embodiment of the present invention. FIG. 9 is a block diagram of the smart lighting device of FIG. 9. Referring to FIGS. 8 and 9, the smart lighting device 100b of the present embodiment further comprises a processing module 160 as compared with the smart lighting device 100 described above. The processing module 160 is electrically connected to the illumination module 110, the image projection module 120, and the light sensing module 130. The processing module 160 is, for example, disposed within the base 141, but the present invention does not limit the location of the processing module 160. The light sensing module 130 is electrically connected to the illumination module 110 and the image projection module 120 via the processing module 160. The processing module 160 adjusts brightness values of the illumination module 110 and the image projection module 120 based on the brightness value of the ambient light sensed by the light sensing module 130 and the image projection mode of the projection module 130.

For example, an illumination area R1 is provided and projections of the illumination area R1 and the image projection module 120 on the irradiation area of the bearing surface C (i.e., the area occupied by the image frame M) are partially overlapped when the image projection module 120 is switched to the bearing surface projection mode, and the processing module 160 may adjust the brightness values of the illumination module 110 and the image projection module 120 in accordance with the brightness value of the sensed ambient light and the bearing surface projection mode. In one embodiment, the method for adjusting the brightness values of the illumination module 110 and the image projection module 120 in accordance with the brightness value of the sensed ambient light and the projection mode of the image projection module 120 can be, for example, first determining whether the brightness value of ambient light reaches the default value. When the brightness value of the ambient light reaches the default value, the brightness value of illumination module 110 is maintained and the brightness value of the image projection module 120 is adjusted in accordance with the brightness value of the ambient light, the projection mode of the image projection module 120, and the default database of the brightness value. When the brightness value of the ambient light does not reach the default value, the brightness values of the illumination module 110 and the image projection module 120 are adjusted in accordance with the brightness value of the ambient light, the projection mode of the image projection module 120, and the default database. For example, the default database has a brightness comparison table for the projection mode of a specific image projection module 120, and the brightness of the illumination module 110 is known from the brightness comparison table and the value should be adjusted to X2 when the brightness value of the ambient light is X1, and the brightness value of the image projection module 120 should be adjusted to X3, where units of the brightness values X1, X2, X3 may be any unit of brightness.

In another embodiment, the method for adjusting the brightness values of the illumination module 110 and the image projection module 120 in accordance with the brightness value of the sensed ambient light and the projection mode of the image projection module 120 can be, for example, adjusting the brightness values of the illumination module 110 and the image projection module 120 in accordance with the brightness value of the ambient light, the projection mode of the image projection module 120, and the default database without performing the step of determining whether the brightness value of the ambient light reaches the default value. In this case, when the brightness value of the ambient light is greater than a certain value (i.e., the brightness value of the ambient light is sufficient), the brightness value of the corresponding illumination module 110 is in a fixed value. That is, it is not necessary to change the brightness value of the illumination module 110 when the brightness of the ambient light is sufficient.

On the other hand, when the smart lighting devices 100 and 100a of FIG. 1A and FIG. 3 are switched to the shooting mode, the brightness values of the illumination module 110 and the image projection module 120 can be adjusted in accordance with the brightness value of the ambient light sensed by the light sensing module 130 and the projection mode of the image projection module 120.

For example, when the shooting mode the image projection module 120 is switched, the method for adjusting the brightness value of the illumination module 110 and the image projection module 120 in accordance with the brightness value of the ambient light sensed by the light sensing module 130 and the projection mode of the video projection module 120 can be, for example, first determining whether the brightness value of the ambient light reaches the default value. When the brightness value of the ambient light reaches the default value, the brightness of the illumination module 110 is maintained. When the brightness value of the ambient light does not reach the default value, the brightness value of the illumination module 110 is adjusted in accordance with the brightness of the ambient light, the projection mode of the image projection module, and the default database. For example, the default database may have a brightness contrast table of a projection mode of a specific image projection module, and when the brightness value of the ambient light is X4, the brightness value of the illumination module 110 can be adjusted to X5 in accordance with the brightness contrast table, wherein units of the brightness values X4, X5 can be any unit of brightness. The image projection module 120 may not project the image light beam or may continuously project image light beam when the shooting mode is switched. In addition, the default values mentioned here may be identical to or different from the default values of the bearing surface projection mode described above depending on the design requirements. In addition, in the configuration of FIG. 1A, the steps for determining and adjusting the brightness values described above can be performed by, for example, an external processing module. In the configuration of FIG. 3, the steps for determining and adjusting the brightness values described above can be performed by, for example, the processing module 160. In other embodiments, the steps for determining and adjusting the brightness values described above can be performed by the light sensing module 130

In another embodiment of switching of the shooting mode, the method for adjusting the brightness values of the illumination module 110 and the image projection module 120 in accordance with to the brightness value of the ambient light sensed by the light sensing module 130 and the projection mode of the image projection module 120 can be, for example, adjusting the brightness value of the illumination module according to the brightness value of the ambient light, the projection mode of the image projection module 120, and the default database without the step of determining whether the brightness value of the ambient light reaches the default value. In this case, when the brightness value of the ambient light is higher than a predetermined value (i.e., the brightness value of the ambient light is sufficient), the brightness value of the corresponding illumination module 110 would be a fixed value. That is, it is not necessary to adjust the brightness value of the illumination module 110 when the brightness of the ambient light is sufficient.

Since the brightness value of the ambient light is sensed by using the light sensing module 130, when the image projection module 120 is switched to the shooting mode, the illumination module 110 can supplement the light or adjust exposure parameters of, for example, a shutter or an aperture of the camera module 170 when insufficient exposure of the object for shooting occurs due to insufficient brightness of the ambient light, thereby improving the shooting effect. Therefore, it can be understood from the above embodiments that adjustments to the brightness value of the image projection module 120 and the illumination module 110 of the smart lighting device of the present invention can be mainly divided into two types of operation. In a first type of operation, the processing module 160 preferentially adjusts the brightness value of the image projection module 120 in accordance with the brightness value sensed by the light sensing module 130. In addition, in a second type of operation, the processing module 160 preferentially adjusts the brightness value of the illumination module 110 in accordance with the brightness value sensed by the light sensing module 130. The first type of operation can be, for example, an image projection operation mode, and the second type of operation can be, for example, an image identifying operation mode. The method that the processing module 160 preferentially adjusts the brightness value of the image projection module can be adjusting the brightness value of the image projected by the image projection module 120 when the ambient light brightness value is changed to maintain the optimum brightness of the projection image, and the method that the processing module 160 preferentially adjusting the brightness value of the illumination module 110 can be adjusting the brightness value of the illumination module 110 to maintain the best image identifying brightness when the ambient light and the brightness value are changed.

Figure 10:
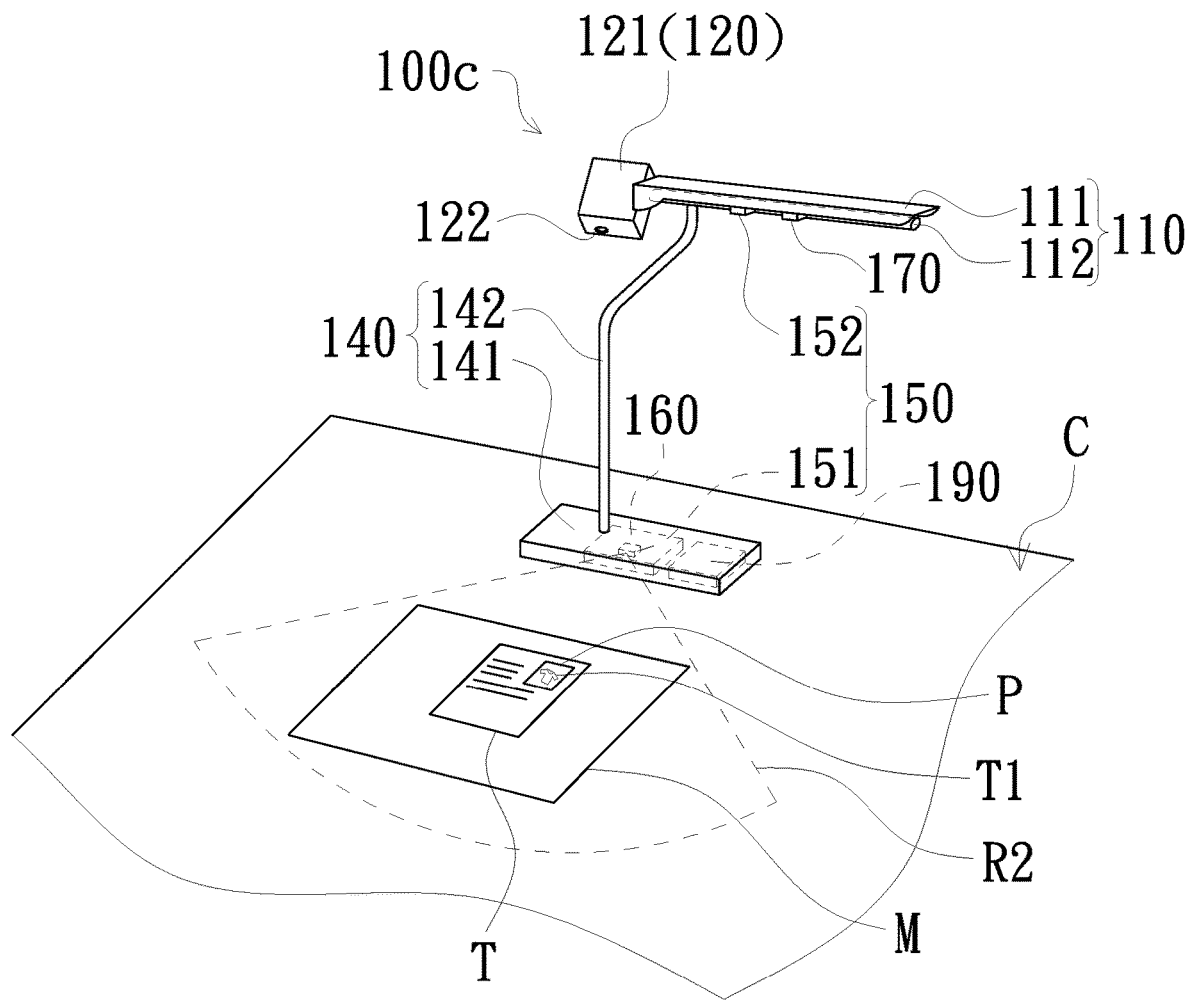
FIG. 10 is a schematic diagram showing a state of use of a smart lighting device according to yet another embodiment of the invention.

FIG. 10 is a schematic view showing a state of use of a smart lighting device according to another embodiment of the present invention. Referring to FIG. 10, the smart lighting device 100c of the present embodiment comprises an image projection module 120, a camera module 170, a sensing module 150, and an identifying module 190. The image projection module 120, the camera module 170, and the sensing module 150 are similar to those in the embodiments described above, wherein the image projection module 120 is configured to project the image frame M, and the sensing steering module 150 comprises the sensing area R2 for sensing user's manipulation gestures in the sensing area R2, and the camera module 170 can shoot an object. The identifying module 190 can be electrically connected to the image projection module 120, the camera module 170, and the sensing module 150, wherein the sensing area R2 formed by the sensing module 150 comprise at least one content to be identified T1 selected by the user, and the camera module 170 is configured to shoot the content to be identified T1 within the area selected by the user in the sensing area R2 to form an image to be identified, and the identifying module 190 is configured to identify the image to be identified, and the image projection module 120 acquires and projects the information identified by the identifying module 190 in the image frame M.

The smart lighting device 100c may further comprise any other element of the smart lighting devices disclosed in any of the embodiments described above, such as the illumination module 110, the support body 140, the processing module 160, and the like. The image projection module 120 is pivoted to the illumination module 110. The support body 140 is configured to stand on the bearing surface C and hold the illumination module 110, the image projection module 120, the camera module 170, the sensing module 150, and the identifying module 190. The identifying module 190 can be, for example, disposed in the base 141, but the present invention does not limit the location of the identifying module 190. The processing module 160 can be electrically connected to the image projection module 120, the camera module 170, the identifying module 190, the sensing module 150, and the illumination module 110. The processing module 160 and the identifying module 190 can be integrated on the same circuit board. Similar to the embodiments described above, the sensing module 150 may be an optical, acoustic, or touch sensing module, and the elements mentioned in the foregoing embodiments will not be described in detail herein.

Figure 11:
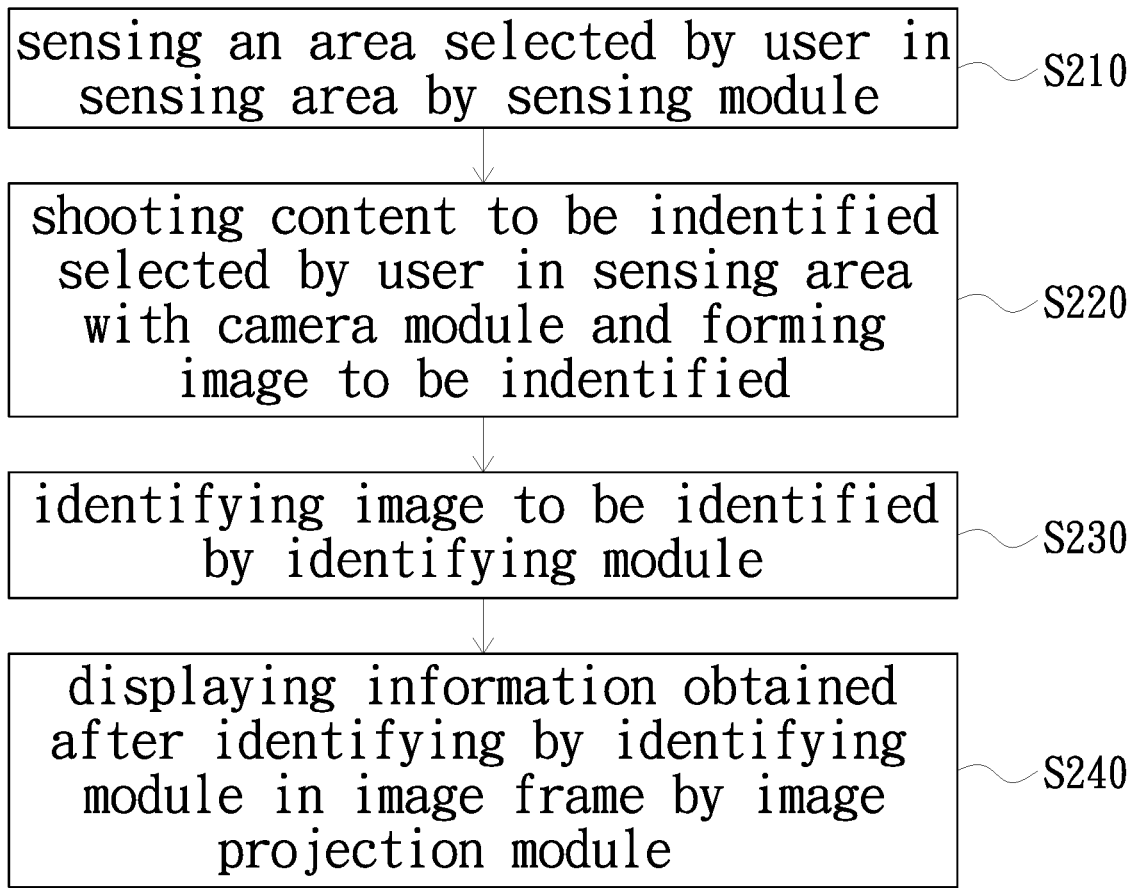
FIG. 11 is a schematic flow chart diagram of a control method of a smart lighting device according to another embodiment of the invention.

FIG. 11 is a flow chart showing a control method of a smart lighting device according to another embodiment of the present invention. Referring to FIGS. 10 and 11, the control method of the smart lighting device of the present embodiment is applicable to the smart lighting device 100c described above and may comprise the following steps. As shown in the step S210, an area selected by the user in the sensing area R2 is sensed by the sensing module 150. Specifically, the smart lighting device 100c comprises an identifying mode, and the identifying mode can be manually switched by the user or automatically switched by the smart lighting device 100c. In the embodiment that is manually switched by the user, the operation mode can be manually switched by the user by using the sensing module 150 to sense the user's switching gestures, or sensing whether the user selects the virtual key representing switching to the identifying mode, or providing the user with a physical key. On the other hand, in the embodiment that the smart lighting device 100c is automatically switched, the sensing module 150, for example, first detects whether the object to be identified T such as papers, books, fruits, models or other various objects is in the sense area R2 before performing the step S210. The object to be identified T in FIG. 10 is using papers as an example, but the present invention does not limit the object to be identified T. In one embodiment, the identifying mode may be determined and entered while the placed object to be identified T is stabilized (e.g., being fixed for a period of time). In addition, after entering the identifying mode, the sensing module 150 may sense the area selected by the user in the sensing area R2. For example, the user selects the area of the clothes in the picture P of the object to be identified T, and the sensing module 150 may sense the user's operation actions to determine the selected area. In addition, after entering the identifying mode, the sensing module 150 may be sensed in an absolute coordinate mode or a relative coordinate mode.

Next, as disclosed in the step S220, the content to be identified T1 (for example, the clothes of the object to be identified T in the picture P) selected by the user in the sensing area R2 is shot by the user with the camera module 170 and forms the image to be identified. The content to be identified T1 includes at least portions of the object to be identified T, which means that the user can select the whole or a part of the object to be identified T for the identification. During shooting the content to be identified T1, the content to be identified T1 in the area selected by the user can be merely shot, or the initial images may be first shot by the camera module 170 (for example, the whole content to be identified T or the entire picture P of the object to be identified T can be first shot), and then the initial image can be clipped according to the area selected by the user to form the image to be identified. In addition, prior to performing shooting by the camera module 170, adjustments comprising keystone corrections, clarity corrections, sharpness corrections, hue adjustments, image clipping, or the like can be performed on the camera module 170. In addition, prior to performing the next step S230, the image to be identified can be subjected to image processing for subsequent identification, thereby improving the identification efficiency and identification accuracy. The above image processing includes keystone corrections, clarity corrections, sharpness corrections, tone adjustments, image clipping, or the like.

Figure 12:
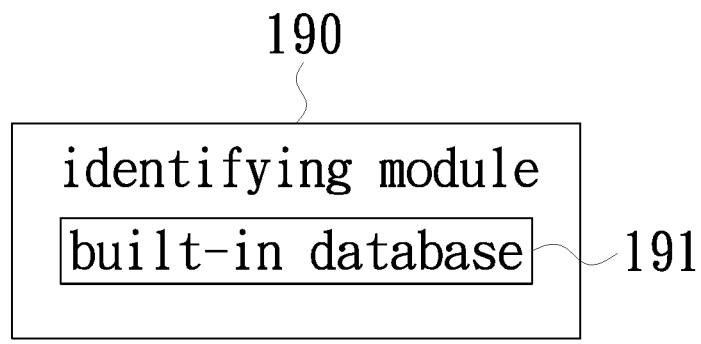
FIG. 12 is a schematic block diagram of an identifying module of a smart lighting device according to an embodiment of the invention.

Next, as disclosed in the step S230, the image to be identified is identified by the identifying module 190. In the present embodiment, as shown in FIG. 12, the identifying module 190 comprises, for example, a built-in database 191 for identifying the image to be identified. That is, the image to be identified can be compared with the built-in database 191 to find relevant information that conforms to the characteristics of the image to be identified. In addition, the identifying module 190 can also be connected to a cloud database to identify the image to be identified. The cloud database can be a specific database or any database that can be connected via the internet. For example, the image to be identified can be first identified by the built-in database 191, and would be connect to the cloud database to identify the image to be identified when the image to be identified is not able to be identified by the built-in database 191. In one embodiment, the image to be identified may also be identified by the built-in database 191 and the cloud database at the same time. In addition, the identifying module 190 may be connected to the cloud database via an external device (such as a host computer) electrically connected to the smart lighting device 100c, or the smart lighting device 100c may also include a networking element (not shown) to connect to the cloud database via this networking element. In addition, the identifying module 190 may not have a built-in database 191, but rather connects to the cloud database to identify the image to be identified.

Next, as disclosed in the step S240, the information obtained after identifying thereof by the identifying module can be displayed in the image frame M by the image projection module 120. For example, using the content to be identified T1 as an example, information such as the manufacturer, the price, the material, the picture, the news, the video and the like of the clothes can be displayed in the image frame M, and the relevant described above is used as an example, and the present invention is not limited thereto. In addition, the image to be identified may be displayed in the image frame M, and the image to be identified may be displayed in the image frame M before the identification thereof is completed or after the identification thereof is completed, and can be displayed with the acquired information in the image frame M at the same time. In an embodiment, the relevant manipulation menu such as an action bar including functions such as copy and print may be displayed with the relevant information of the content to be identified T1 at the same time for further manipulation by the user.

It is noted that, during obtaining the information of the image to be identified, the information displayed in the image frame M can be determined based on the user's data or set values. For example, user information may be screened based on information such as age, gender, hobby, and the like, to avoiding unnecessary data access at the same time. Further, since the smart lighting device 100c can be electrically connected to an external device (such as a host computer), the user's information such as the user's login account (including the cloud account number) can be obtained via the external device. On the other hand, the information of the image selected and identified by the user can be integrated as the user's personal note data via the processing module 160. For example, when a user reads a book and important text fragments or pictures are selected and identified, and the processing module 160 can make the selected text fragments or pictures into a personal note in the chronological order.

In the smart lighting device 100c and the control method of the present embodiment, the camera module 170 captures a part or the whole object to be identified T selected by the user via the camera module 170 and the information provided by the camera module 170 is identified by the identifying module 190, and then the information obtained by the identifying module 190 is displayed in the image frame M. As a result, this allows users to easily access the information.

In the step S220 described above, the content to be identified T1 can be shot form, for example, a single angle, and a two-dimensional image of the content to be identified T1 can be shot. In another embodiment, in the step S220 described above, a three dimensional image of the content to be identified T1 can be also shot. In the embodiment in which the three-dimensional images are shot from, for example, a plurality of angles of the content to be identified T1, and then the images shot from the plurality of angles are integrated into a three-dimensional image. In this way, the identification accuracy can be improved, and the three-dimensional dimension scales (such as length, width, height) of the content to be identified T1 can also be determined.

Figure 13:
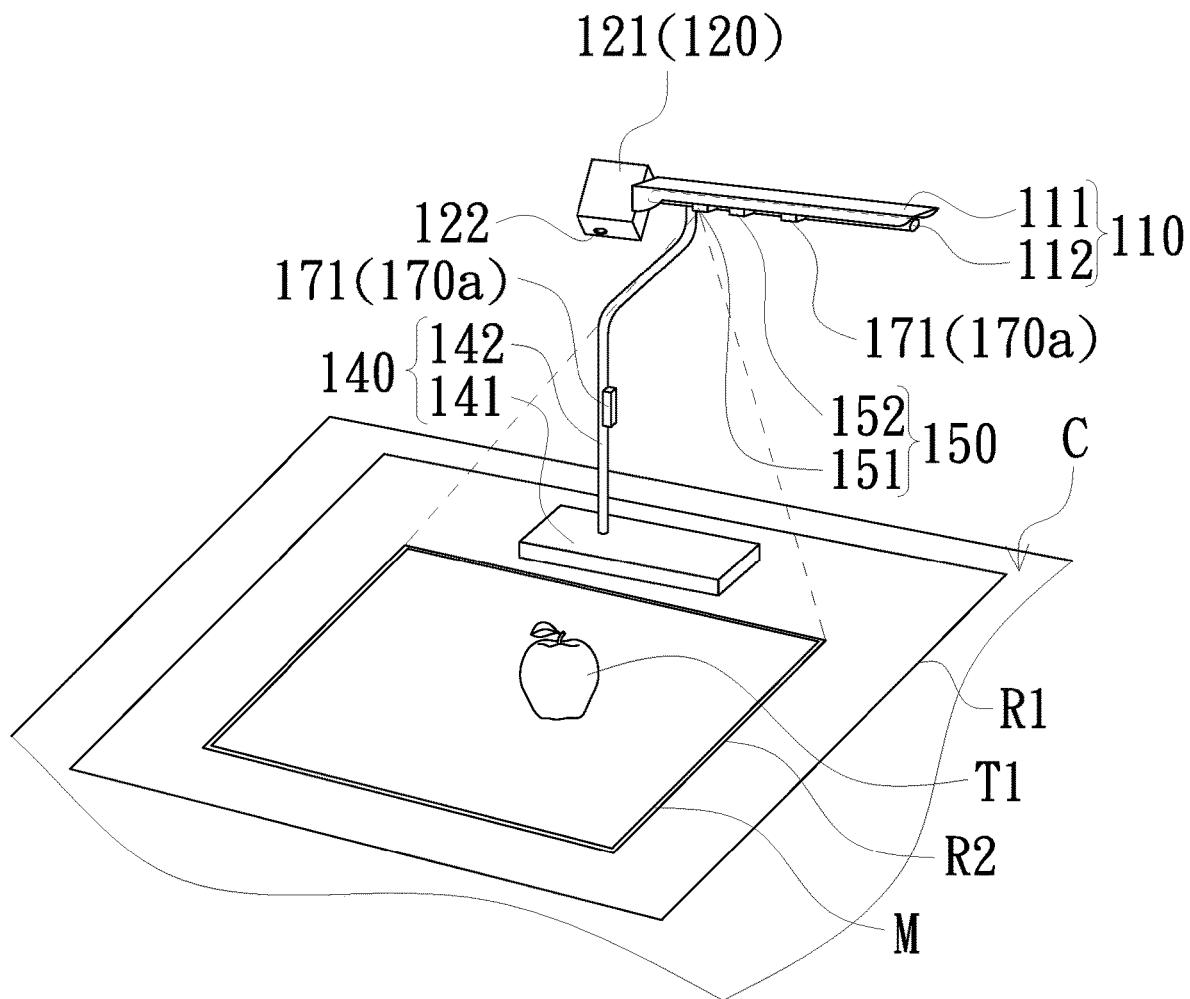
FIG. 13 is a schematic diagram showing a state of use of a smart lighting device according to another embodiment of the invention.

FIG. 13 is a schematic view showing a state of use of the smart lighting device according to another embodiment of the present invention. Referring to FIG. 13, the camera module 170a in the present embodiment includes, for example, a plurality of image capturing elements 171 and photosensitive elements (not shown) thereof. In FIG. 13, the number of image capturing elements 171 is two as an example, but the present invention does not limit the number of image capturing elements 171 and the photosensitive element (not shown) thereof and the locations thereof. In FIG. 13, the two image capturing elements 171 and the photosensitive elements (not shown) thereof are, for example, arranged on the lamp housing 111 and the support frame 142, respectively, to shoot the content to be identified T1 from two different angles, and the images taken from different angles are then integrated into a three-dimensional image. In addition, when the content to be identified T1 is a stereoscopic content, once the light emitting element 151 is disposed on the base 141, the formed area of the sensing area R2 may be affected, so that the location of the light emitting element 151 can be elevated (e.g. disposing on the lamp housing 112 in the illumination module 110) to prevent the content to be identified T1 from affecting the formed area of the sensing element R2.

Figure 14:
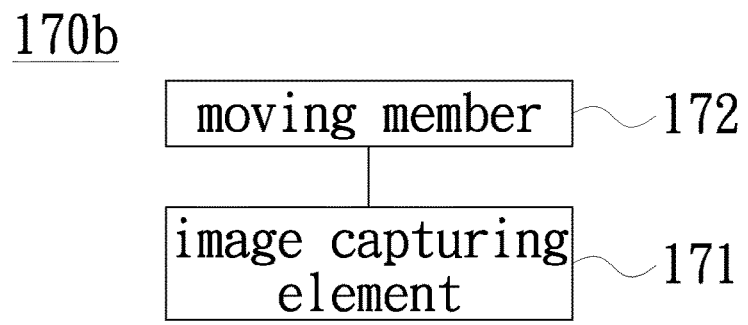
FIG. 14 is a schematic diagram showing a camera module of a smart lighting device according to another embodiment of the invention.

The camera module 170a can also be replaced with the camera module 170b shown in FIG. 14 to shoot the content to be identified from a plurality of angles. Specifically, the camera module 170b comprises an image capturing element 171 and a moving member 172. The moving member 172 is connected to the image capturing element 171, and the moving member 172 is used to move the image capturing element 171 to shoot the content to be identified from a plurality of angles.

Figure 15:
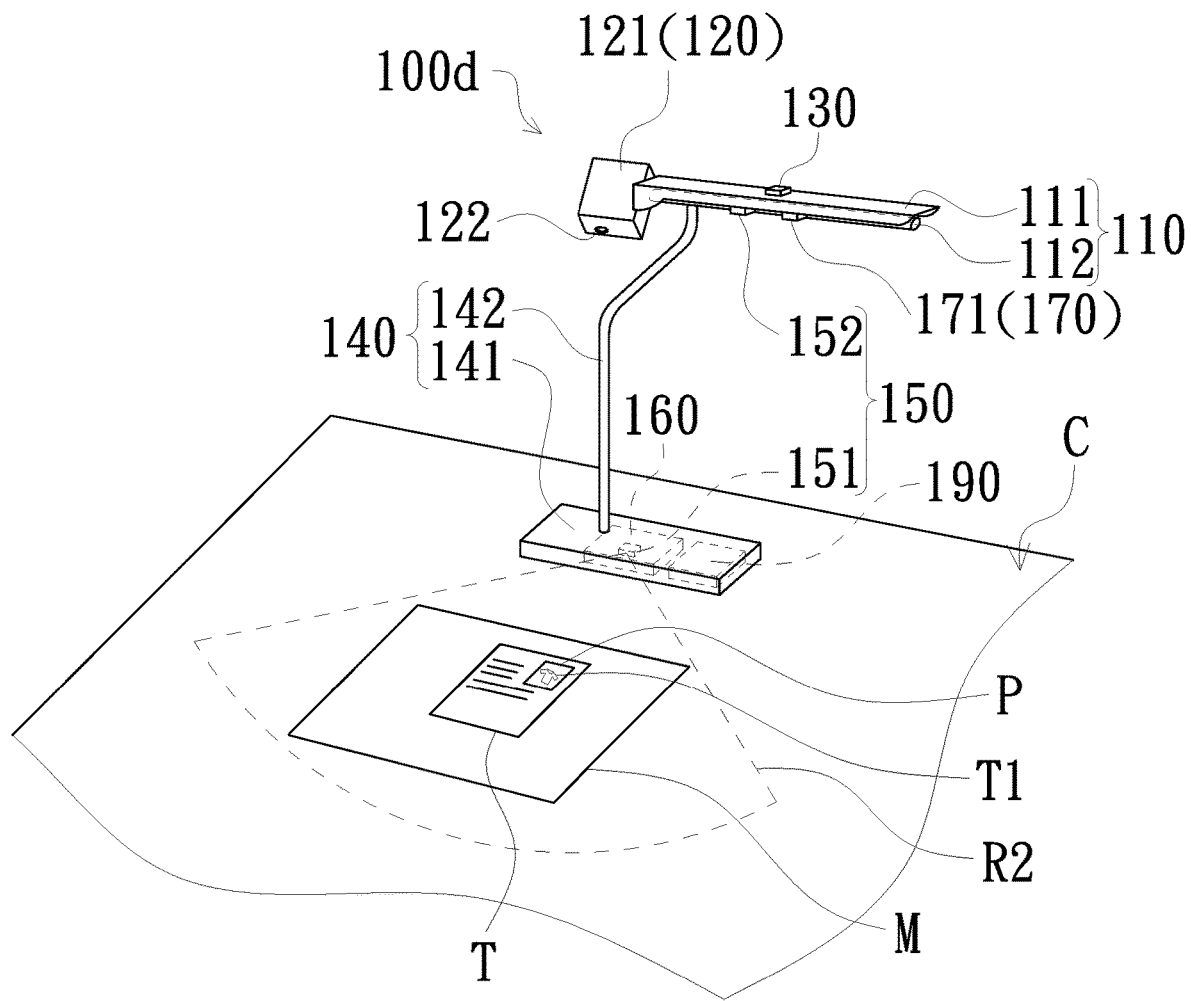
FIG. 15 is a schematic diagram showing a state of use of a smart lighting device according to another embodiment of the invention.

FIG. 15 is a schematic view showing a state of use of the smart lighting device according to another embodiment of the present invention. Referring to FIG. 15, the smart lighting device 100d of the present embodiment comprises an image projection module 120, a sensing module 150, a camera module 170, a light sensing module 130, and an illumination module 110. The image projection module 120 is configured to project the image frame M. The sensing module 150 comprises a sensing area R2 for sensing user's manipulation in the sensing area R2. There are at least the content to be identified T1 selected by the user in the sensing area R2 formed by the sensing module 150. The camera module 170 is used to shoot the content to be identified T1 in the sensing area R2 to form an image to be identified. The camera module 170 comprises at least one image capturing element 171 and photosensitive elements (not shown) thereof. The light sensing module 130 is configured to sense brightness of the ambient around the smart lighting device 100d. The illumination module 110 provides suitable illumination light beam for the content to be identified T1 in accordance with the ambient brightness of the smart lighting device 100d for the ease of shooting by the camera module 170. When the light sensing module 130 is composed of one or a plurality of ambient light sensing elements, the photosensitive element (not shown) of the at least one image capturing elements 171 of the camera module 170 detects insufficient illumination of the content to be identified T1, and the brightness of the illumination module 110 would be adjusted to provide suitable illumination light beam for the content to be identified T1. The brightness of the illumination module 110 is maintained when the photosensitive element (not shown) of the at least one image capturing element 171 of the camera module 170 detects sufficient illumination of content to be identified T1. In addition, when the light sensing module 130 includes one or several ambient light sensing elements and the photosensitive element of the camera module, the exposure parameters of the camera module 170 or the brightness of the illumination module 110 can be adjusted to provide suitable illumination light beam for the content to be identified T1 when the light sensing module 130 senses that the ambient light illumination device 100d has insufficient ambient light illumination. When the light sensing module 130 senses sufficient ambient light illumination around the smart lighting device 100d, the brightness of the illumination module 110 would be maintained. In other words, when the illumination of the content to be identified is insufficient T1, the shooting quality would be adjusted by supplementing illumination by the illumination module 110 or adjusting exposure parameters of the camera module 170. When the illumination of the content to be identified T1 is sufficient, it is no longer necessary to supplement the light by the illumination module 110.

The smart lighting device 100d of the present embodiment may include any of the other elements of the smart lighting device disclosed in any of the above embodiments, such as the identifying module 190, the processing module 160, the support body 140, or the like. The identifying module 190 is electrically connected to the image projection module 120, the camera module 170, and the sensing module 150. The identifying module 190 is configured to identify the image to be identified, and the image projection module 120 displays the acquired information identified by the identifying module 190 in the image frame M. Similar to the above embodiments, the identifying module 190 may have a built-in database for identifying the image to be identified. The identifying module 190 may also be connected to the cloud database to identify the image to be identified. The processing module 160 is electrically connected to the image projection module 120, the camera module 170, the identifying module 190, the light sensing module 130, the sensing module 150, and the illumination module 110. The support body 140 is configured to be stand on the bearing surface C for holding the illumination module 110, the processing module 160, the image projection module 120, the camera module 170, the light sensing module 130, the sensing module 150, and the identifying module 190. Similar to the previous embodiments, the sensing module 150 comprises, for example, a light emitting element 151 and a light receiving element 152. The camera module 170 further includes a moving member (not shown) for moving the image capturing element 171 to shoot the content to be identified from a plurality of angles. The camera module 170 may also include a plurality of image capturing elements 171 and photosensitive elements (not shown) thereof to shoot the content to be identified from multiple angles. The elements mentioned in the foregoing embodiments will not be described in detail herein.

Figure 16:
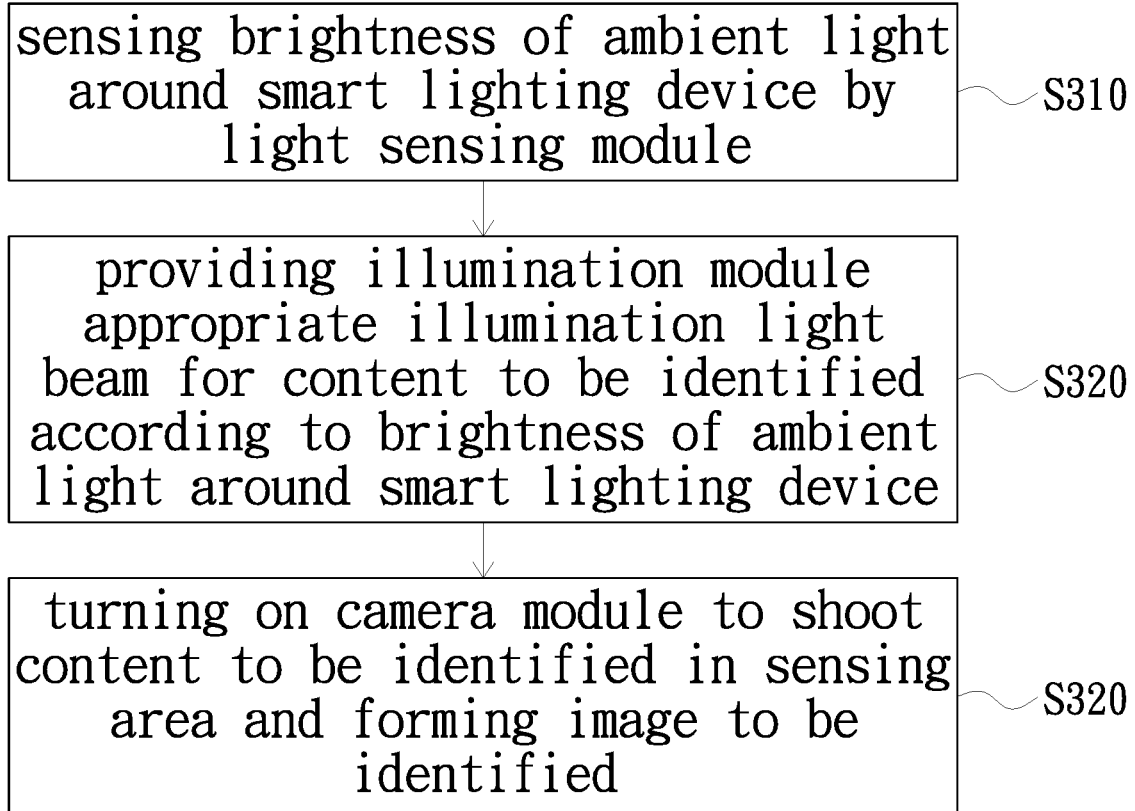
FIG. 16 is a flow chart of a control method of a smart lighting device according to another embodiment of the invention.

FIG. 16 is a flowchart showing a control method of a smart lighting device according to another embodiment of the present invention. Referring to FIGS. 15 and 16, the control method of the smart lighting device of the present embodiment is applicable to the smart lighting device 100d described above and may include the following steps. As shown in step S310, the brightness of the ambient light around the smart lighting device 100d is sensed by the light sensing module 130.

Next, as shown in step S320, the illumination module 110 provides appropriate illumination light beam for the content to be identified T1 according to the brightness of the ambient light around the smart lighting device 100d. For example, when the ambient light is dark, light would be supplemented by the illumination module 110 or the exposure parameters of the camera module 170 would be compensated. In addition, when the ambient light is bright, there is no need to supplement light by the illumination module 110. As described in the foregoing embodiments, there are methods of adjusting the brightness value of the illumination module 110 to provide a suitable illumination light source, and to compare the ambient light sensed by the light sensing module 130 with a default database to obtain the related values.

Next, as shown in step S330, the camera module 170 is turned on to shoot the content to be identified T1 in the sensing area R2 and forms the image to be identified. In addition, as the camera module 170 is turned on, the brightness of the illumination module 110 can be adjusted or the exposure parameters of the camera module 170 can be adjusted to provide appropriate illumination light beam for the content to be identified T1 when the at least one photosensitive member 171 of the camera module 170 detects insufficient illumination of the content to be identified T1. When shooting of the camera module 170 is completed, the control method of the smart lighting device of the present embodiment may further include the step of adjusting the brightness of the illumination module 110 back to its original brightness. On the other hand, when the camera module 170 is turned on, the brightness of the illumination module 110 is maintained when the at least one of the photosensitive members 171 of the camera module 170 detects sufficient illumination of the content to be identified T1. In addition, during shooting of the content to be identified T1, the content to be identified T1 can be shot from, for example, at least one angle by the camera module 170. When the camera module 170 comprises a plurality of image capturing elements 171, the content to be identified T1 can be shot from, for example, various angles during shooting thereof by the image capturing elements 171, and the image to be identified can be, for example, synthesized from the original images shot by the image capturing elements 171. In addition, during shooting of the content to be identified T1, the initial images can be captured by the camera module 170 and are then clipped according to the area selected by the user and forms the image to be identified.

The control method of the smart lighting device of the present embodiment may further include the steps described in the foregoing embodiment. For example, it may comprise at least one of the following steps: (1) sensing the sensing area in the sensing area R2 by the sensing module 150 to sensing whether an object to be identified T is disposed therein prior to selecting the area in the sensing area R2 by the user via the sensing module 150, and the content to be identified T1 comprises at least one portion of the object to be identified T; (2) displaying the image to be identified in the image frame M; (3) performing an image processing on the image to be identified prior to identifying of the image to be identified, and (4) determining the information displayed in the image screen based on the user's data while obtaining the information of the image to be identified.

Figure 17:
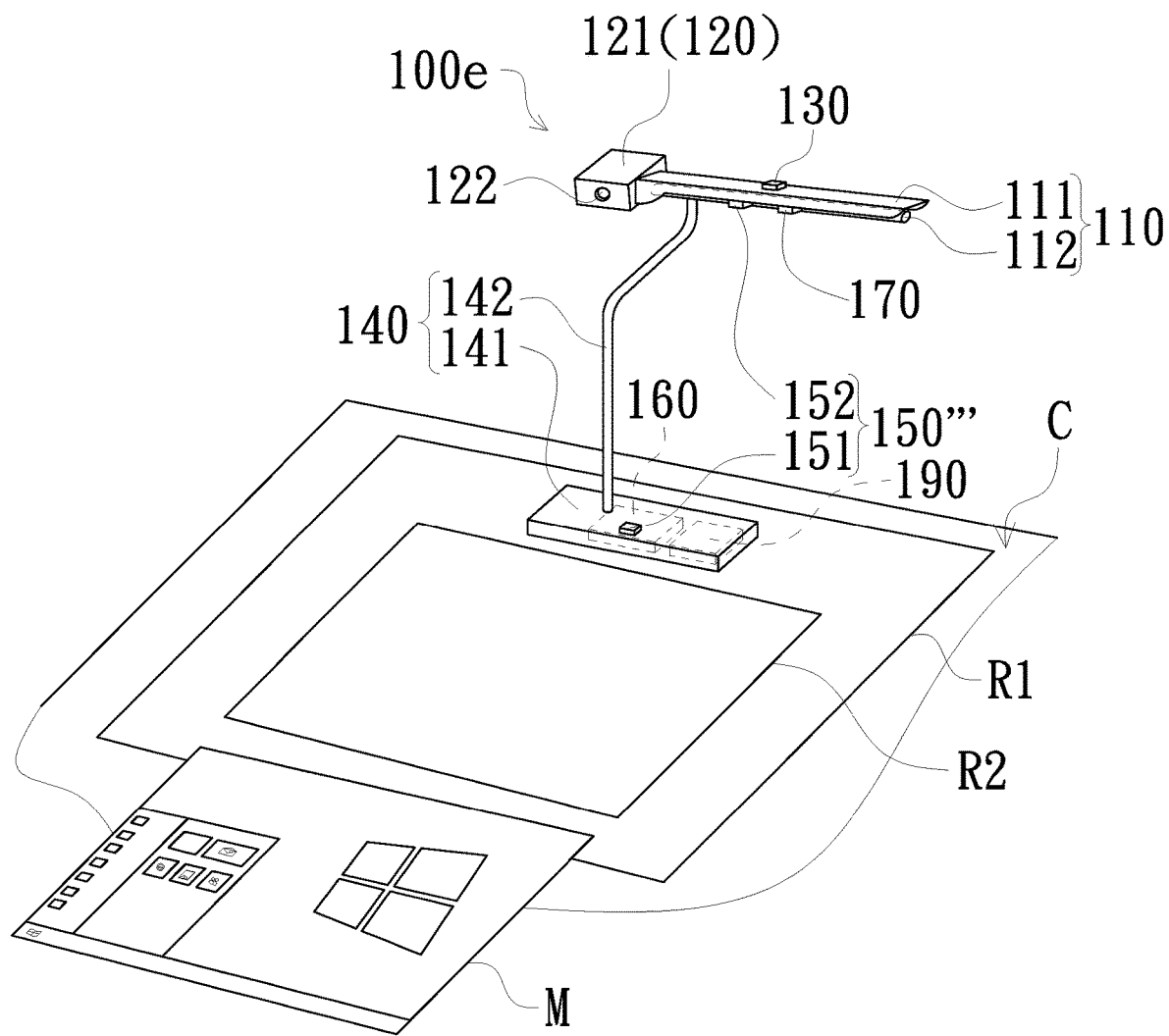
FIG. 17 is a schematic diagram showing a state of use of a smart lighting device according to yet another embodiment of the invention.

FIG. 17 is a schematic diagram showing a state of use of a smart lighting device according to yet another embodiment of the invention. Referring to FIG. 17, the smart lighting device 100e of the present embodiment includes an illumination module 110, a sensing module 150''', and an image projection module 120, as compared with the smart lighting device 100e described above. In the present embodiment, the sensing area R2 is used to sense the user's manipulation actions after forming the sensing area R2 on the bearing surface C of the smart lighting device 100c by the sensing module 150'''. When the image projection module 120 is rotated relative to the illumination module 110 and the image frame M projected by the image projection module 120 is outside the sensing area R2 formed by the sensing module 150''', the sensing area R2 formed by the sensing module 150''' is a sensing area for contents of the image frame M.

As described above, when the light emitting element 151 of the sensing module 150''' forms a sensing area (i.e., the sensing area R2) on the bearing surface C, the relationship between the sensing area formed by the sensing module 150''' and the image frame M projected by the image projection module 120 is in the absolute coordinate mode. For example, when the image projection module 120 is switched to the sidewall projection mode or the ceiling projection mode, the sensing module 150''' can be switched to the absolute coordinate mode. In this way, the user can directly form a touch control area on the bearing surface C by the sensing module 150''' for various operations (for example, clicking or inputting on a virtual keyboard), thereby having effects similar to a touch screen.

FIG. 18 is a schematic flowchart of an operation mode transforming method of a smart lighting device according to an embodiment of the invention. The operation mode transforming method is applicable to any of the smart lighting devices 100, 100a, 100b, 100c, 100d, 100e described in the above embodiments, and the operation mode transforming method can be switched between the first operation mode and the second operation mode. The first operation mode can be the standby mode described in the above embodiment, and the second operation mode can be one of the operation modes of the bearing surface projection mode, the sidewall projection mode, and the ceiling projection mode. As shown in FIG. 11 and described with reference to the embodiment shown in FIG. 6, the operation mode transforming method of the present embodiment includes the following steps. In the step S210, the processing module 160 disables the video projection module 120 and the processing module 160 adjusts the brightness value of the illumination module 110 to the first brightness value when the image projection mode module 120 is in the first operation mode. Next, in the step S220, the processing module 160 controls the image projection module 120 to switch from the first operation mode to the second operation mode and simultaneously adjusts the image frame of the image projection module at the same time when a rotation angle of the image projection module 120 relative to the illumination module 110 is the first angle. The detailed operation mode transforming method may correspond to a schematic structural view of the various operation modes disclosed with reference to FIGS. 5A to 5D.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A smart lighting device standing on a bearing surface and having a plurality of projection modes, comprising:
   an illumination module;
   a camera assembly; and
   an image projection module adjacent to the illumination module and pivotally connected to the illumination module,
   wherein the image projection module has the projection modes, the projection modes are formed by different rotation angles of the image projection module relative to the illumination module, and a brightness value of the illumination module is adjusted in accordance with the projection modes of the image projection module.

2. The smart lighting device according to claim 1, wherein the smart lighting device further comprises a light sensing assembly for sensing a brightness of ambient light around the smart lighting device.

3. The smart lighting device according to claim 2, wherein the ambient light comprises daylight, artificial light, light reflection of objects, and light reflection of wall surfaces and bearing surfaces.

4. The smart lighting device according to claim 2, wherein the light sensing assembly comprises a sensing element for the ambient light or a photosensitive element of at least one image capturing element of the camera assembly.

5. The smart lighting device according to claim 4, wherein the brightness value of the ambient light is sensed by the sensing element for the ambient light.

6. The smart lighting device according to claim 4, wherein the brightness value of the ambient light is sensed by the photosensitive element of the image capturing element of the camera assembly.

7. The smart lighting device according to claim 4, wherein the brightness value of the ambient light is sensed by the sensing element for the ambient light and the photosensitive element of at least one image capturing element of the camera assembly.

8. The smart lighting device according to claim 2, further comprising a processing module electrically connected to the illumination module, the image projection module and the light sensing assembly, and the light sensing assembly is electrically connected with the illumination module and the image projection module through the processing module, and the processing module adjusts the brightness values of the illumination module and the image projection module in accordance with the brightness value of the ambient light sensed by the light sensing assembly.

9. The smart lighting device according to claim 8, wherein the processing module first determines whether the brightness value of the ambient light reaches a default value, and the processing module maintains the illumination module and adjusts the brightness value of the image projection module in accordance with the ambient light and a default database when the brightness value of the ambient light reaches the default value, or the processing module adjusts the brightness values of the illumination module and the image projection module in accordance with the ambient light and the default database when the ambient light does not reach the default value.

10. The smart lighting device according to claim 8, wherein the processing module adjusts the brightness values of the illumination module and the image projection module in accordance with the ambient light and a default database.

11. The smart lighting device according to claim 8, wherein the illumination module illuminates the bearing surface for holding the smart lighting device, and the camera assembly is electrically connected to the processing module, and the smart lighting device comprises a plurality of operation modes, and one of the operation modes is a shooting mode, and the processing module adjusts the brightness values of the illumination module and the image projection module in accordance with the ambient light sensed by the light sensing assembly when the smart lighting device is switched to the shooting mode.

12. The smart lighting device according to claim 11, wherein the processing module first determines whether the ambient light reaches a default value, and the processing module maintains the brightness of the illumination module when the ambient light reaches the default value, or the processing module adjusts the brightness value of the illumination module in accordance with the ambient light and a default database when the ambient light does not reach the default value.

13. The smart lighting device according to claim 11, wherein the processing module adjusts the brightness value of the illumination module is in accordance with the ambient light and a default database.

14. The smart lighting device according to claim 8, further comprising a sensing module, wherein the sensing module is electrically connected with the processing module and comprises an absolute coordinate mode and a relative coordinate mode, and the image projection module comprises a plurality of projection modes, and the projection modes comprises a bearing surface projection mode and at least one wall surface projection mode, and the processing module controls the sensing module to be switched to the absolute coordinate mode when the image projection module is switched to the bearing surface mode, or the process module controls the sensing module to be switched to the relative coordinate mode when the image projection module is switched to each of the wall surface modes.

15. The smart lighting device according to claim 14, wherein the sensing module comprises:
a light emitting element electrically connected to the processing module and configured to form a sensing area on the bearing surface for holding the smart light device; and
a light receiving element electrically connected to the processing module and disposed on the illumination module, and a sensing field of the light receiving element covers the sensing area.

16. The smart lighting device according to claim 15, wherein the light emitting device is an infrared emitting element, and the light receiving element is an infrared receiving element.

17. The smart lighting device according to claim 15, further comprising a support body configured to stand on the bearing surface, wherein the illumination module is connected with the support body to face the bearing surface, wherein the light sensing assembly is disposed on a side of the illumination module away from the bearing surface, and the light emitting element is disposed on a base of the support body configured to connect the bearing surface or the illumination module.

18. The smart lighting device according to claim 1, further comprising a processing module electrically connected to the image projection module, the illumination module, and the camera assembly, wherein the image projection module has a plurality of projection modes, and one of the projection modes is a bearing surface projection mode, and the illumination module is configured to form an illumination area over the bearing surface for holding the smart light device, and the illumination area and an illumination area over the bearing surface projected by the image projection module are partially overlapped when the image projection module is switched to the bearing surface projection mode, and the processing module adjusts the brightness values of the illumination module and the image projection module in accordance with the brightness value of the sensed ambient light.

19. A control method of a smart lighting device comprising a plurality of operation modes, capable of applying in a smart lighting device comprising an illumination module, an image projection module, and a light sensing assembly, wherein the image projection module is pivoted to the illumination module, and the control method of the smart lighting device comprising:
sensing a brightness value of ambient light by the light sensing assembly; and
adjusting brightness values of the illumination module and the image projection module in accordance with the brightness value of the sensed ambient light,
wherein the illumination module illuminates a bearing surface for holding the smart lighting device, and the image projection module comprises a plurality of projection modes, and one of the projection modes is a bearing surface projection mode, and an illumination area on the bearing surface projected by the illumination module and an illumination area on the bearing surface projected by the image projection module are partially overlapped when the image projection module is switched to the bearing surface projection mode, and the brightness values of the illumination module and the image projection module are adjusted in accordance with the brightness value of the sensed ambient light.

20. The control method of the smart lighting device according to claim 19, wherein the ambient brightness comprises daylight, artificial light, light reflection of objects, and light reflection of wall surfaces and bearing surfaces.

21. The control method of the smart lighting device according to claim 19, further comprises a step of adjusting brightness values of the illumination module and the image projection module in accordance with a projection mode of the image projection module.

22. The control method of the smart lighting device according to claim 19, wherein the step of adjusting the brightness values of the illumination module and the image projection module in accordance with the brightness value of the sensed ambient light comprises steps of:
determining whether the brightness value of the ambient light reaches a default value; and
maintaining the brightness value of illumination module and adjusting the brightness value of the image projection module in accordance with the brightness value of the ambient light when the brightness value of the ambient light reaches the default value, or adjusting the brightness values of the illumination module and the image projection module in accordance with the ambient light and a default database when the brightness value of the ambient light does not reach the default value.

23. The control method of the smart lighting device according to claim 19, wherein the step of adjusting the brightness values of the illumination module and the image projection module in accordance with the brightness value of the sensed ambient light comprises:
adjusting the brightness values of the illumination module and the image projection module in accordance with the brightness value of the ambient light and a default database.

24. The control method of the smart lighting device according to claim 19, wherein the smart lighting device further comprises a camera assembly, and the camera assembly comprises a plurality of operation modes, and one of the operation modes is a shooting mode, and the brightness values of the illumination module and the image projection module are adjusted in accordance with the brightness value of the sensed ambient light when the smart lighting device is switched to the shooting mode.

25. The control method of the smart lighting device according to claim 24, wherein the step of adjusting the brightness values of the illumination module and the image projection module in accordance with the brightness value of the sensed ambient light comprises:
determining whether the brightness value of the ambient light reaches a default value; and maintaining the brightness value of the illumination module when the brightness value of the ambient light reaches the default value or adjusting the brightness value of the illumination module in accordance with the brightness value of the ambient light and a default database when the brightness value of the ambient light does not reach the default value.

26. The control method of the smart lighting device according to claim 24, wherein the step of adjusting the brightness values of the illumination module and the image projection module in accordance with the brightness value of the sensed ambient light comprises:
adjusting the brightness values of the illumination module and the image projection module in accordance with the brightness values of the ambient light and the default database.

27. The control method of the smart lighting device according to claim 24, wherein the smart lighting device further comprises a sensing module, and the sensing module has an absolute coordinate mode and a relative coordinate mode, and the projection modes further comprises at least one wall surface projection mode, and the sensing module is switched to the absolute coordinate mode when the image projection module is switched to the bearing surface mode, or the sensing module is switched to the relative coordinate mode when the image projection module is switched to each of the wall surface modes.

28. A control method of a smart lighting device comprising first and second operation modes, capable of applying in a smart lighting device comprising a processing module electrically connected with an illumination module, an image projection module, and a light sensing assembly, wherein the image projection module is adjacent to the illumination module and is pivotally connected to the illumination module, the image projection module has a plurality of projection modes, the projection modes are formed by different rotation angles of the image projection module relative to the illumination module, and the control method of the smart lighting device comprising:
preferentially adjusting a brightness value of the image projection module through the processing module in accordance with a brightness value of the sensed ambient light under the first operation mode; or
preferentially adjusting a brightness value of the illumination module through the processing module in accordance with the brightness value of the sensed ambient light under the second operation mode.

29. The control method of the smart lighting device according to claim 28, wherein the first operation mode of the smart lighting device is an image projection operation mode.

30. The control method of the smart lighting device according to claim 28, wherein the second operation mode of the smart lighting device is an image identification operation mode.

31. The control method of the smart lighting device according to claim 28, wherein the step of preferentially adjusting the brightness value of the image projection module is to adjust a brightness value of an image frame projected by the image projection module to maintain the best projection brightness of the image frame when the brightness value of the ambient light is changed.

32. The control method of the smart lighting device according to claim 28, wherein the step of preferentially adjusting the brightness value of the illumination module is to adjust a brightness value of the illumination module to maintain the best identification brightness when the brightness value of the ambient light is changed.

* * * * *